(12) United States Patent
Zhou et al.

(10) Patent No.: US 12,009,900 B2
(45) Date of Patent: Jun. 11, 2024

(54) TECHNIQUES FOR BEAM FAILURE RECOVERY IN WIRELESS COMMUNICATIONS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/469,220

(22) Filed: Sep. 8, 2021

(65) Prior Publication Data

US 2023/0076253 A1     Mar. 9, 2023

(51) Int. Cl.
*H04W 72/04*    (2023.01)
*H04B 7/08*    (2006.01)
(Continued)

(52) U.S. Cl.
CPC .............. *H04B 7/088* (2013.01); *H04L 1/203* (2013.01); *H04W 24/10* (2013.01); *H04W 76/19* (2018.02); *H04W 80/02* (2013.01)

(58) Field of Classification Search
CPC ........ H04B 7/088; H04L 1/203; H04W 24/10; H04W 76/19; H04W 80/02
See application file for complete search history.

(56) References Cited

U.S. PATENT DOCUMENTS

2019/0014570 A1*    1/2019  Nam ................. H04B 7/0695
2019/0173740 A1*    6/2019  Zhang ............... H04B 7/0695
(Continued)

FOREIGN PATENT DOCUMENTS

WO    WO-2019242853 A1 * 12/2019
WO    WO-2020032653 A1    2/2020

OTHER PUBLICATIONS

Ericsson: "Overview of RAN2 Impacts for BFR and BFD for mTRP Operation", 3GPP TSG-RAN WG2 Meeting #115, R2-2108806, 3rd Generation Partnership Project, Mobile Competence Centre, 650, Route Des Lucioles, F-06921 Sophia-Antipolis Cedex, France, vol. RAN WG2, No. electronic, Aug. 16, 2021-Aug. 27, 2021, Aug. 6, 2021, XP052035137, the whole document, pp. 1-10.
(Continued)

*Primary Examiner* — Mahbubul Bar Chowdhury
(74) *Attorney, Agent, or Firm* — Dalei Dong; Holland & Hart LLP

(57) ABSTRACT

Methods, systems, and devices for wireless communications are described for detection of beam failure and beam failure recovery. A user equipment (UE) may perform measurements on one or more reference signals for one or more beams. In the event that one of the beams has a measurement that indicates a potential beam failure, the UE may increment a beam failure count (BFC) at a physical layer of the UE, and start a BFC timer. In the event that the BFC reaches a threshold value prior to expiration of the BFC timer, the UE may trigger a switch to a different active beam, provide a beam failure indication (BFI) to a higher layer of the UE, or both. A higher layer at the UE may autonomously adjust a BFI threshold for a number of BFIs that are needed to trigger a beam failure declaration to the base station.

30 Claims, 19 Drawing Sheets

(51) Int. Cl.
  *H04L 1/20* (2006.01)
  *H04W 24/10* (2009.01)
  *H04W 76/19* (2018.01)
  *H04W 80/02* (2009.01)

(56) References Cited

U.S. PATENT DOCUMENTS

| | | | |
|---|---|---|---|
| 2019/0253941 A1* | 8/2019 | Cirik | H04W 36/0077 |
| 2019/0297648 A1* | 9/2019 | Nagaraja | H04B 7/063 |
| 2019/0394082 A1 | 12/2019 | Cirik et al. | |
| 2020/0053779 A1* | 2/2020 | Jeon | H04B 17/318 |
| 2020/0374960 A1* | 11/2020 | Deenoo | H04W 74/0833 |
| 2021/0105644 A1 | 4/2021 | Mo et al. | |
| 2021/0336688 A1 | 10/2021 | Lee et al. | |
| 2022/0022065 A1* | 1/2022 | Wang | H04W 24/08 |
| 2022/0116876 A1* | 4/2022 | Sun | H04W 52/0235 |
| 2022/0132517 A1* | 4/2022 | Zhu | H04L 5/0094 |
| 2022/0217556 A1* | 7/2022 | Rydén | H04W 36/245 |
| 2022/0312237 A1* | 9/2022 | Zhang | H04B 7/0695 |
| 2023/0079182 A1* | 3/2023 | Chen | H04B 7/088 |

OTHER PUBLICATIONS

International Search Report and Written Opinion—PCT/US2022/039562—ISA/EPO—dated Nov. 21, 2022.

\* cited by examiner

TECHNIQUES FOR BEAM FAILURE RECOVERY IN WIRELESS COMMUNICATIONS

FIELD OF TECHNOLOGY

The following relates to wireless communications, including techniques for beam failure recovery in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may communicate with a base station using one or more beams. In such systems, it may be appropriate for the UE to support techniques for detecting beam failure.

SUMMARY

The described techniques relate to improved methods, systems, devices, and apparatuses that support techniques for beam failure recovery in wireless communications. A UE may use the techniques described herein to detect beam failure and initiate beam failure recovery. In one aspect, the UE may perform measurements on beam failure detection reference signals received from the base station for one or more beams. In the event that one of the beams has a measurement that indicates a potential beam failure, the UE may increment a beam failure counter (BFC) at a physical layer of the UE, and start a BFC timer. In the event that the BFC reaches a threshold value prior to expiration of the BFC timer, the UE may trigger a switch to a different active beam (e.g., by transmitting a layer one (L1) measurement report to a base station), provide a beam failure indication (BFI) to a higher layer (e.g., a medium access control (MAC) layer) at the UE, or any combinations thereof.

Additionally, or alternatively, the higher layer at the UE (e.g., the MAC layer) may autonomously adjust a BFI threshold for a number of BFIs that are needed to trigger a beam failure declaration (BFD) that is transmitted to the base station, and initiate a beam failure recovery procedure to obtain one or more new active beams. In some cases, to further improve the flexibility of beam management at the UE, the base station may signal a level of autonomy with which the UE is to manage beam failure detection operations. In such cases, each UE may be able to manage beam failure detection operations based on its capabilities.

A method for wireless communication at a user equipment (UE) is described. The method may include measuring one or more reference signals transmitted by a base station on at least a first beam to obtain one or more reference signal measurements of the first beam, identifying a presence of a beam failure indication based on a beam failure count threshold and a number of the one or more reference signal measurements that are above a measurement threshold value, and transmitting a beam failure declaration to the base station based on a number of instances of the beam failure indication and a variable threshold for triggering the beam failure declaration.

An apparatus for wireless communication at a UE is described. The apparatus may include a processor, memory coupled with the processor, and instructions stored in the memory. The instructions may be executable by the processor to cause the apparatus to measure one or more reference signals transmitted by a base station on at least a first beam to obtain one or more reference signal measurements of the first beam, identify a presence of a beam failure indication based on a beam failure count threshold and a number of the one or more reference signal measurements that are above a measurement threshold value, and transmit a beam failure declaration to the base station based on a number of instances of the beam failure indication and a variable threshold for triggering the beam failure declaration.

Another apparatus for wireless communication at a UE is described. The apparatus may include means for measuring one or more reference signals transmitted by a base station on at least a first beam to obtain one or more reference signal measurements of the first beam, means for identifying a presence of a beam failure indication based on a beam failure count threshold and a number of the one or more reference signal measurements that are above a measurement threshold value, and means for transmitting a beam failure declaration to the base station based on a number of instances of the beam failure indication and a variable threshold for triggering the beam failure declaration.

A non-transitory computer-readable medium storing code for wireless communication at a UE is described. The code may include instructions executable by a processor to measure one or more reference signals transmitted by a base station on at least a first beam to obtain one or more reference signal measurements of the first beam, identify a presence of a beam failure indication based on a beam failure count threshold and a number of the one or more reference signal measurements that are above a measurement threshold value, and transmit a beam failure declaration to the base station based on a number of instances of the beam failure indication and a variable threshold for triggering the beam failure declaration.

In some examples of the method, apparatuses, and non-transitory computer-readable medium described herein, the measuring and identifying is performed at a physical layer of the UE, and a MAC layer determines the variable threshold for triggering the beam failure declaration. In some examples of the method, apparatuses, and non-transitory computer-readable medium described herein, the measuring may include operations, features, means, or instructions for measuring a reference signal received power of the one or more reference signals and determining a BLER estimate for communications with the base station on the first beam based on the reference signal received power. In some examples of the method, apparatuses, and non-transitory computer-readable medium described herein, the identifying the presence of the beam failure indication may include operations, features, means, or instructions for determining that the BLER estimate exceeds the measurement threshold value, updating a beam failure count based on the determining that the BLER estimate exceeds the measurement threshold value, and initiating a beam failure count timer if the beam failure count timer may be not running.

In some examples of the method, apparatuses, and non-transitory computer-readable medium described herein, the identifying the presence of the beam failure indication may include operations, features, means, or instructions for determining, prior to an expiration of the beam failure count timer, that the updated beam failure count meets the beam failure count threshold and transmitting, to the base station, a L1 measurement report to trigger a beam switch from the first beam to a second beam, where the second beam is an established beam for communications with the base station prior to the measuring. In some examples of the method, apparatuses, and non-transitory computer-readable medium described herein, the BLER estimate may be determined for a single beam that is established for communications between the UE and the base station, and the beam failure indication is provided to a MAC layer when the updated beam failure count meets the beam failure count threshold prior to an expiration of the beam failure count timer, or the BLER estimate is determined for two or more beams that are established for communications between the UE and the base station and beam failure counts are maintained separately for each of the two or more beams, and the beam failure indication is provided to the MAC layer when the updated beam failure counts of each of the two or more beams meet the beam failure count threshold prior to expiration of the beam failure count timer. In some examples of the method, apparatuses, and non-transitory computer-readable medium described herein, the beam failure count threshold may be selected from a first value or a second value based on channel conditions between the UE and the base station, the first value being less than the second value, and where the first value may be selected based on identification of relatively poor channel conditions and the second value may be selected based on identification of relatively good channel conditions.

Some examples of the method, apparatuses, and non-transitory computer-readable medium described herein may further include operations, features, means, or instructions for receiving, from the base station, one or more beam failure parameters that indicate the beam failure count threshold, the measurement threshold value, a beam failure count timer value, or any combinations thereof. In some examples of the method, apparatuses, and non-transitory computer-readable medium described herein, the one or more beam failure parameters may be received in radio resource control (RRC) signaling, in a MAC control element, in a downlink control information communication, or any combinations thereof. Some examples of the method, apparatuses, and non-transitory computer-readable medium described herein may further include operations, features, means, or instructions for transmitting, to the base station, a request to switch the one or more beam failure parameters in a MAC control element, or an uplink control information communication. In some examples of the method, apparatuses, and non-transitory computer-readable medium described herein, the variable threshold may be determined autonomously at the UE.

Some examples of the method, apparatuses, and non-transitory computer-readable medium described herein may further include operations, features, means, or instructions for adjusting the variable threshold based on a number of consecutive beam failure indications (BFIs) that have been received from a physical layer of the UE for two or more reference signal measurement occasions. In some examples of the method, apparatuses, and non-transitory computer-readable medium described herein, the adjusting may include operations, features, means, or instructions for adjusting a BFI count threshold for triggering the beam failure declaration to be higher than an initial BFI count threshold value when the number of consecutive BFIs is less than a predetermined value and adjusting the BFI count threshold to be lower than the initial BFI count threshold value when the number of consecutive BFIs is equal to or greater than the predetermined value.

In some examples of the method, apparatuses, and non-transitory computer-readable medium described herein, the variable threshold may be determined based on one or more calculation procedures configured by the base station via RRC signaling, a MAC control element, a downlink control information communication, or any combinations thereof. In some examples of the method, apparatuses, and non-transitory computer-readable medium described herein, the variable threshold may be determined by a machine learning algorithm based on the one or more reference signal measurements of a signal and interference to noise ratio (SINR), a signal to noise ratio (SNR), a reference signal received power (RSRP), an interference measurement, or any combinations thereof.

Some examples of the method, apparatuses, and non-transitory computer-readable medium described herein may further include operations, features, means, or instructions for transmitting, to the base station, a capability indication that the UE can perform autonomous adjustments of the variable threshold. Some examples of the method, apparatuses, and non-transitory computer-readable medium described herein may further include operations, features, means, or instructions for receiving, from the base station, an activation or deactivation signal that activates or deactivates the autonomous adjustments of the variable threshold. In some examples of the method, apparatuses, and non-transitory computer-readable medium described herein, the capability indication may be based on a machine learning capability of the UE, an amount of processing power or processing capacity available at the UE, an amount of memory available at the UE, an amount of available computation resources available at the UE, or any combinations thereof.

A method for wireless communication at a base station is described. The method may include transmitting first control information to a UE that configures beam failure indications based on a beam failure count threshold and a number of reference signal measurements that are above a measurement threshold value for at least a first beam, transmitting second control information to the UE that configures reporting of a beam failure declaration based on an amount of beam failure indications and a variable threshold for the beam failure declaration, transmitting one or more reference signals to the UE via the first beam, and receiving, from the UE responsive to the one or more reference signals, one or more of a measurement report or the beam failure declaration that indicates communications with the UE are to be switched from the first beam to a second beam.

An apparatus for wireless communication at a base station is described. The apparatus may include a processor, memory coupled with the processor, and instructions stored in the memory. The instructions may be executable by the processor to cause the apparatus to transmit first control information to a UE that configures beam failure indications based on a beam failure count threshold and a number of reference signal measurements that are above a measurement threshold value for at least a first beam, transmit second control information to the UE that configures reporting of a beam failure declaration based on an amount of beam failure indications and a variable threshold for the beam failure declaration, transmit one or more reference signals to the UE via the first beam, and receive, from the UE responsive to the one or more reference signals, one or more of a measurement report or the beam failure declaration that indicates communications with the UE are to be switched from the first beam to a second beam.

Another apparatus for wireless communication at a base station is described. The apparatus may include means for transmitting first control information to a UE that configures beam failure indications based on a beam failure count threshold and a number of reference signal measurements that are above a measurement threshold value for at least a first beam, means for transmitting second control information to the UE that configures reporting of a beam failure declaration based on an amount of beam failure indications and a variable threshold for the beam failure declaration, means for transmitting one or more reference signals to the UE via the first beam, and means for receiving, from the UE responsive to the one or more reference signals, one or more of a measurement report or the beam failure declaration that indicates communications with the UE are to be switched from the first beam to a second beam.

A non-transitory computer-readable medium storing code for wireless communication at a base station is described. The code may include instructions executable by a processor to transmit first control information to a UE that configures beam failure indications based on a beam failure count threshold and a number of reference signal measurements that are above a measurement threshold value for at least a first beam, transmit second control information to the UE that configures reporting of a beam failure declaration based on an amount of beam failure indications and a variable threshold for the beam failure declaration, transmit one or more reference signals to the UE via the first beam, and receive, from the UE responsive to the one or more reference signals, one or more of a measurement report or the beam failure declaration that indicates communications with the UE are to be switched from the first beam to a second beam.

In some examples of the method, apparatuses, and non-transitory computer-readable medium described herein, the first control information provides one or more beam failure parameters for use at a physical layer of the UE to estimate a BLER and update a beam failure count based on BLER estimates from the reference signal measurements. Some examples of the method, apparatuses, and non-transitory computer-readable medium described herein may further include operations, features, means, or instructions for receiving, from the UE, a L1 measurement report to trigger a beam switch from the first beam to the second beam, where the second beam is an established beam for communications with the UE prior to the transmitting the one or more reference signals.

In some examples of the method, apparatuses, and non-transitory computer-readable medium described herein, the variable threshold may be determined autonomously at the UE. In some examples of the method, apparatuses, and non-transitory computer-readable medium described herein, the second control information configures one or more calculation procedures and may be transmitted to the UE via RRC signaling, a MAC control element, a DCI communication, or any combinations thereof. Some examples of the method, apparatuses, and non-transitory computer-readable medium described herein may further include operations, features, means, or instructions for receiving, from the UE, a capability indication that the UE can perform autonomous adjustments of the variable threshold, and where the second control information may be transmitted to the UE based on the capability indication.

DETAILED DESCRIPTION

Figure 1:
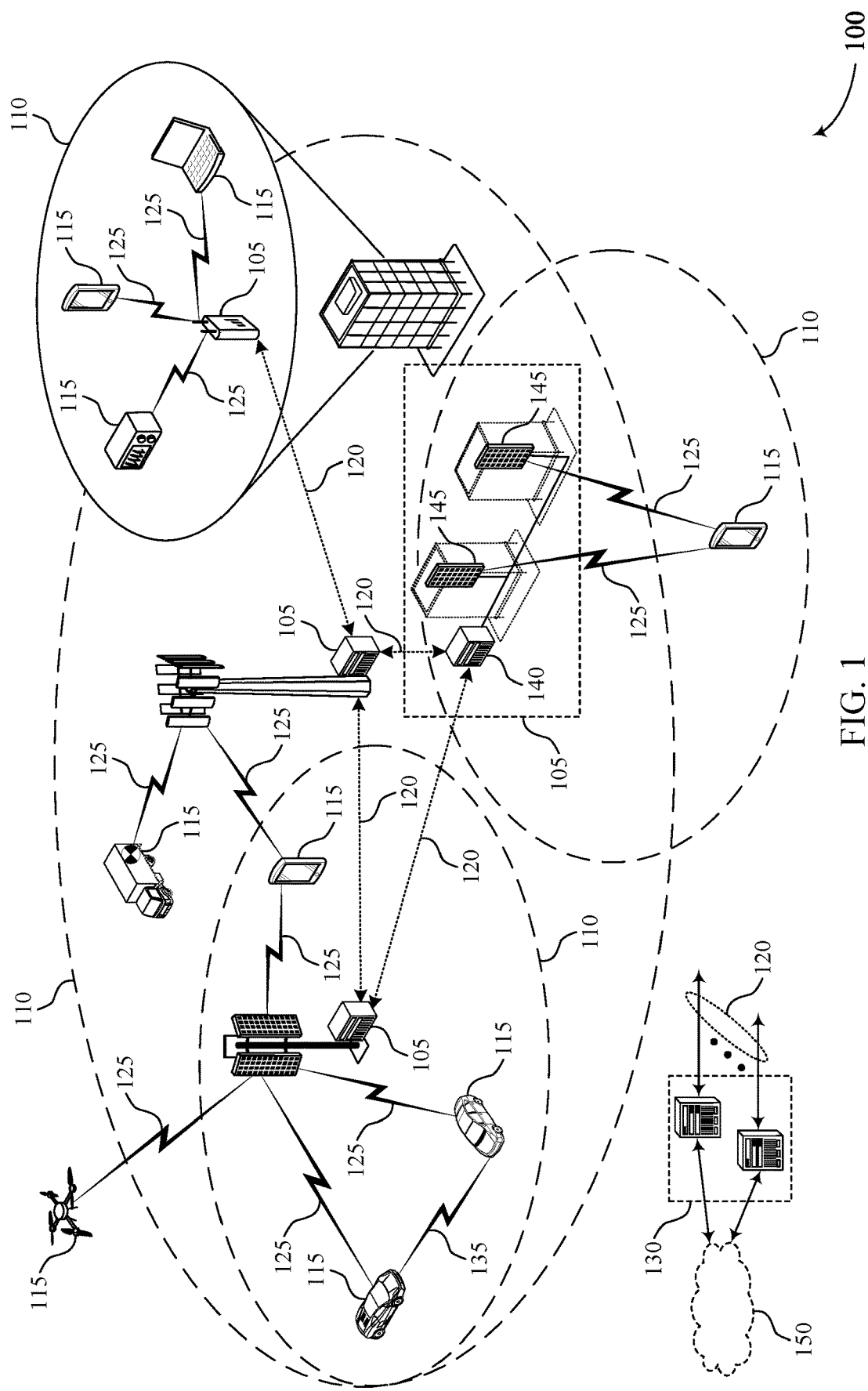
FIG. 1 illustrates an example of a wireless communications system that supports techniques for beam failure recovery in wireless communications in accordance with aspects of the present disclosure.

In some wireless communications systems, a user equipment (UE) may communicate with a base station using one or more beams. In such systems, it may be appropriate for the UE to support techniques for detecting beam failure. To facilitate beam failure detection at the UE, a base station may configure the UE with one or more thresholds against which to compare measurements to detect beam failure. In particular, the UE may perform measurements on beam failure detection reference signals (BFD-RSs) received from the base station (e.g., channel state information (CSI) reference signals, synchronization signals (SSs) transmitted in synchronization signal blocks (SSBs), demodulation reference signals (DMRSs), and the like), and the UE may compare the measurements to the one or more thresholds to detect beam failure. For example, beam failure detection procedures may provide that the UE estimates a block error rage (BLER) based on a reference signal measurement at the PHY layer, and the PHY layer reports a beam failure indication (BFI) to a medium access control (MAC) layer at the UE if the BLER is greater than a BLER threshold. The MAC layer may initiate a beam failure declaration (BFD) timer and if a number of BFIs received at the MAC layer reach a BFI threshold (e.g., a maxCount threshold) before expiration of the timer, the UE will declare a beam failure and transmit a beam failure declaration (BFD) to the base station to initiate a beam switch through a beam training procedure in order to establish a new active beam.

In some cases, multiple active beam pairs may be configured at a UE, and the beam failure procedure may be adjusted to require the estimated BLER on each beam to be above the BLER threshold before BFI is provided to the MAC layer. Such procedures may result in the UE transmitting a BFD only when each active beam has failed. In some cases, if one of the active beams has a BLER estimate that is above the BER threshold, the PHY layer at the UE may transmit a layer one (L1) measurement report to the base station to prompt a switch to a different active beam of the multiple active beam pairs, and also may provide an associated BFI to the MAC layer. Such techniques, however, may provide that the UE maintains one or more bad beams as active beams, and may also result in relatively frequent beam switches among active beams in some scenarios (e.g., where one beam experiences intermittent interference). Further, the BFI threshold at the MAC layer may be semi-statically configured by the base station, and not be adaptable by a UE according to current channel conditions at the UE, which may result in an early or late beam failure declaration.

In various aspects of the present disclosure, the UE may perform measurements on BFD-RSs received from the base station for one or more beams and, in the event that one of the beams has a measurement that indicates a potential beam failure, the UE may increment a beam failure counter (BFC) at a physical layer of the UE, and start a BFC timer. In the event that the BFC reaches a threshold value prior to expiration of the BFC timer, the UE may trigger a switch to a different active beam (e.g., by transmitting a L1 measurement report to a base station), provide a BFI to a higher layer (e.g., a MAC layer) at the UE, or any combinations thereof. Additionally, or alternatively, the higher layer at the UE (e.g., the MAC layer) may autonomously adjust the BFI threshold (e.g., an adaptive or variable BFI threshold) for a number of BFIs that are needed to trigger a BFD that is transmitted to the base station to initiate a new beam training procedure to establish one or more new active beams. In some cases, the adaptive or variable BFI threshold may be based on a function of consecutive BFIs that are received from the PHY layer (e.g., the threshold may be increased if the consecutive BFIs is less than a certain value, and may be decreased if the consecutive BFIs is greater than the certain value). The adaptive or variable threshold may be determined based on machine learning algorithms, and activation/deactivation may be configured by the base station. In some cases, to further improve the flexibility of beam management at the UE, the base station may signal a level of autonomy with which the UE is to manage beam failure detection operations. In such cases, each UE may be able to manage beam failure detection operations based on its capabilities.

Techniques as discussed herein may thus provide for more efficient beam management for wireless communications. For example, implementation of a BFC at a UE may mitigate frequent beam switching that may occur if just a single BFI detected on one beam may trigger a L1 measurement report to switch active beams. Further, adaptive BFI thresholds may provide more timely beam failure declarations based on current conditions at the UE. Such techniques may thus enhance reliability and efficiency for communications, by providing for enhanced efficiency and accuracy for beam management.

Aspects of the disclosure are initially described in the context of wireless communications systems. Examples of processes and signaling exchanges that support beam failure detection are then described. Aspects of the disclosure are further illustrated by and described with reference to apparatus diagrams, system diagrams, and flowcharts that relate to techniques for beam failure recovery in wireless communications.

FIG. 1 illustrates an example of a wireless communications system 100 that supports techniques for beam failure recovery in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $Al_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

As discussed above, in wireless communications system 100, a UE 115 may communicate with a base station 105 using one or more beams. Accordingly, it may be appropriate for the UE 115 to support beam management procedures to, for example, detect beam failure. In one example, as part of a beam management procedure, the UE 115 may receive an indication of a threshold against which to compare measurements (e.g., a signal-to-interference-plus-noise ratio (SINR) or BLER) to detect beam failure. The UE 115 may then perform measurements on BFD-RSs received from the base station 105 (e.g., periodic BFD-RSs, CSI-RSs, SSs, DMRSs, etc.) and determine, at a PHY layer at the UE 115, whether the measurements satisfy the threshold.

If the measurements fail to satisfy the threshold (e.g., if an estimated BLER is less than a BLER threshold), the PHY layer at the UE 115 may send a BFI to the MAC layer at the UE 115. Thus, the threshold configured by the base station 105 used to compare measurements may be referred to as BFI determination criteria. In some examples, the threshold may be a BLER threshold (e.g., 10% BLER), and a trigger condition for sending the BFI may be related to an estimated BLER satisfying the BLER threshold. The MAC layer may keep a count of the BFIs received from the PHY layer, and, if the quantity of BFIs received from the PHY layer satisfies a BFI threshold, the MAC layer may trigger the UE 115 to transmit a beam failure report to the base station 105.

Because the base station 105 may configure the BFI determination criteria (i.e., the threshold), the BFD-RSs, etc., and the UE 115 may perform beam failure detection operations according to signaling instructions from the base station 105, the base station 105 may control the UE 115 in BFI related procedures. In some cases, the base station 105 may also switch configurations (e.g., BFI determination criteria, BFD-RSs configurations, etc.) when appropriate. As a result, the control overhead associated with facilitating beam management at the UE 115 may be high. Further, because the UE 115 may wait to receive control signaling from the base station 105 before attempting to detect beam failure, the UE 115 may experience processing delays related to detecting beam failure.

As described herein, a wireless communications system may support efficient techniques to facilitate beam failure detection at a UE 115. In some aspects of the techniques described herein, the UE 115 may perform measurements on BFD-RSs received from the base station 105 for one or more active beams and, in the event that one of the beams has a measurement that indicates a potential beam failure, the UE 115 may increment a BFC at a physical layer of the UE, and start a BFC timer. In the event that the BFC reaches a threshold value prior to expiration of the BFC timer, the UE 115 may trigger a switch to a different active beam (e.g., by transmitting a L1 measurement report to the base station 105), provide a BFI to a higher layer (e.g., a MAC layer) at the UE 115, or any combinations thereof.

Additionally, as more and more capabilities are introduced or become available at UEs 115 (e.g., at a UE side), UEs 115 may perform some tasks autonomously (e.g., based on machine learning). In some other additional or alternative aspects of the techniques described herein, a UE 115 may be configured to autonomously adjust a BFI threshold for declaring a beam failure and transmitting a BFD to a base station 105. Using this technique and others described herein, the beam failure detection accuracy and reaction time at a UE 115 may be improved. As a result, the UE 115 may have a potentially faster and more accurate reaction time to beam failure events. Further, such techniques may relax base station resources because less resources may be used to control the UE 115.

Figure 2:
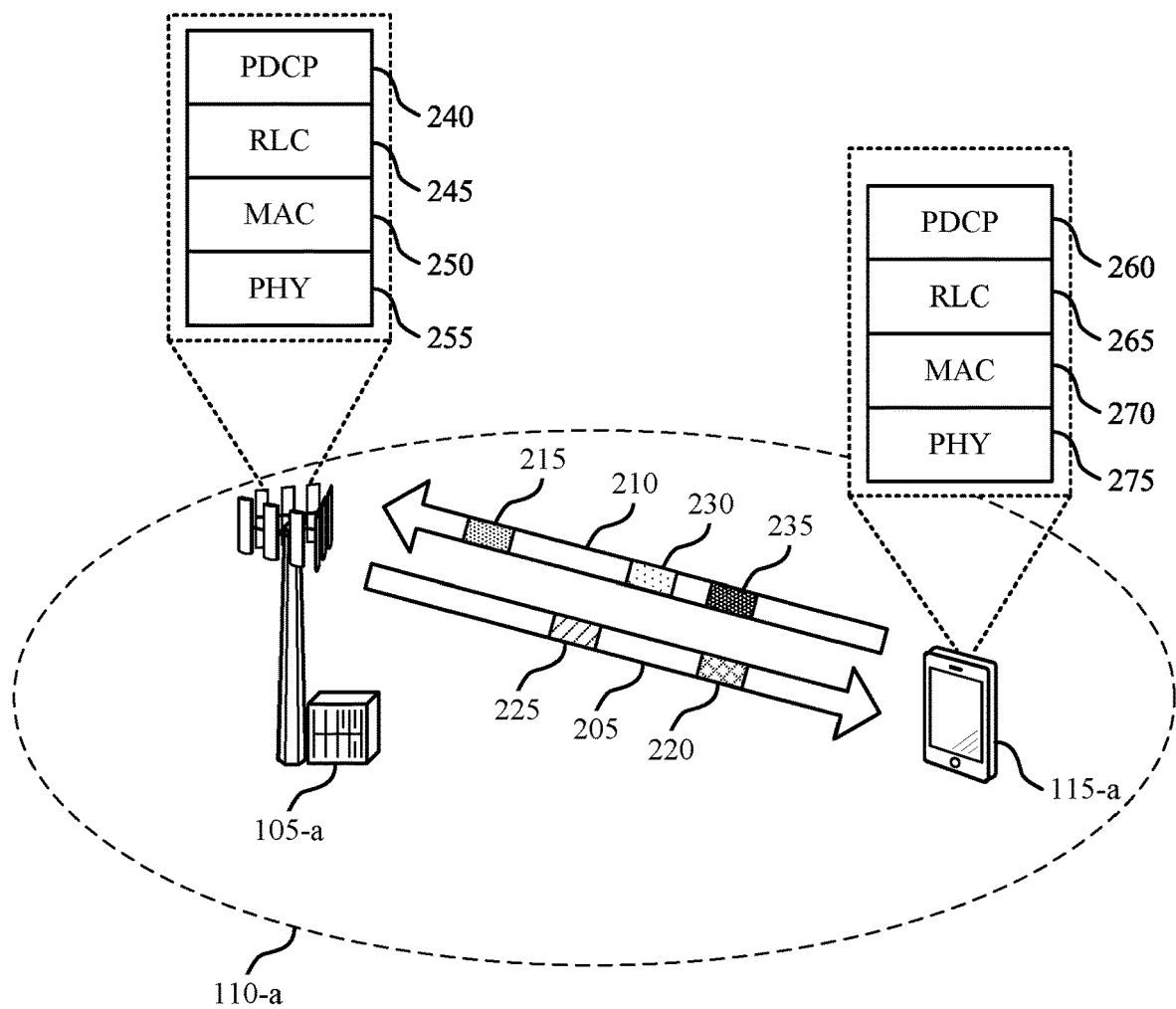
FIG. 2 illustrates an example of a portion of a wireless communications system that supports techniques for beam failure recovery in wireless communications in accordance with aspects of the present disclosure.

FIG. 2 illustrates an example of a wireless communications system 200 that supports techniques for beam failure recovery in wireless communications in accordance with aspects of the present disclosure. The wireless communications system 200 includes a UE 115-*a*, which may be an example of a UE 115 described with reference to FIG. 1. The wireless communications system 200 also includes a base station 105-*a*, which may be an example of a base station 105 described with reference to FIG. 1. The UE 115-*a* may communicate with the base station 1050*a* on resources of a carrier 205 and a carrier 210 (e.g., which may correspond to different or the same carriers). The wireless communications system 200 may implement aspects of the wireless communications system 100. For example, the wireless communications system 200 may support efficient techniques to facilitate beam failure detection at the UE 115-*a*.

Similar to wireless communications system 100, wireless communications system 200 may be a packet-based network that operates according to a layered protocol stack. In the user plane, the base station 105-*a* may include radio access network layers including a PDCP layer 240, RLC layer 245, MAC layer 250, and PHY layer 255, and UE 115-*a* may include corresponding radio access network layers including a PDCP layer 260, RLC layer 265, MAC layer 270, and PHY layer 275. Although the examples described herein relate to techniques performed at the MAC layer 270, the PHY layer 275, or both, it is to be understood that all or portions of the described techniques may be implemented at another layer at the UE 115-*a*.

In the example of FIG. 2, the UE 115-*a* may provide a capability indication 215 to the base station 105-*a*. The capability indication 215 may provide, for the UE 115-*a*, an indication of supported machine learning features, processing power and capacity, memory capacity, computation resources, and the like. In some cases, the capability indication 215 may be provided in RRC signaling with other UE 115-*a* capability information. In other cases, the capability indication 215 may be provided to the base station 105-*a* in a MAC control element (MAC-CE) or in uplink control information (UCI). The base station 105-*a* may transmit configuration information 220 to the UE 115-*a*, which may configure parameters for beam failure detection and reporting.

In some cases, the configuration information may activate or deactivate UE 115-*a* autonomy for determining one or more beam failure detection procedure parameters (e.g., activation/deactivation of adaptive BFI thresholds at the MAC layer), which may be based on the reported capabilities of the UE 115-*a*. In some cases, the configuration information 220 may be provided in RRC signaling, in one or more MAC-CEs, in downlink control information (DCI), or any combinations thereof. In some cases, the UE 115-*a* may request to activate or deactivate one or more autonomy features (e.g., via MAC CE or UCI).

The base station 105-*a* may transmit reference signals 225 to the UE 115-*a*, which may be used for beam failure detection (e.g., on the carrier 205), and the UE 115-*a* may perform one or more measurements on the reference signals 225 (e.g., BFD-RSs) received from the base station 105-*a*. In some cases, the PHY layer 275 at the UE 115-*a* may estimate a BLER based on reference signal 225 measurements (e.g., based on a reference signal received power (RSRP)), and compare the BLER against a BLER threshold to identify a presence of a BFI. While various examples discussed herein describe a BLER parameter that is used to determine a BFI, one or more other measurements may be used in addition to, or alternatively to, a BLER estimate. For example, the UE 115-*a* may use one or more measurements of signal to interference and noise ratio (SINR), signal-to-noise ratio (SNR), RSRP, received signal strength indicator (RSSI), pathloss, interference, or combinations thereof, to determine a BFI (e.g., as opposed to determining a BFI based solely on a BLER estimate from one or more RSRP measurements). These measurements may be referred to as channel condition measurements.

In some cases, the UE 115-*a* may determine the BFI at the PHY layer 275 at the UE 115-*a*, and an indication used to identify a BFI may be provided from the PHY layer 275 to the MAC layer 270. In some other examples, the UE 115-*a* may send the one or more measurements performed on the reference signals 225 from the PHY layer 275 to the MAC layer 270. In such examples, the UE 115-*a* may determine the BFI at the MAC layer 270 The UE 115-*a* may then use the BFI at the MAC layer 270 to detect beam failure (e.g., increment a BFI counter at the MAC layer 270).

In some cases, the UE 115-*a* may determine whether to report the BFI to the MAC layer 270 based on a BFC that may be incremented each time a reference signal 225 measurement is below a threshold (e.g., when a BLER estimate is below a BLER threshold). In the event that the BFC reaches a BFC threshold before a BFC timer expires, the PHY layer 275 may provide a BFI indication to the MAC layer 270. Further, in cases where multiple beams are configured at the UE 115-*a*, the UE 115-*a* may transmit an L1 measurement report 230 to the base station 105-*a* based on the BFC counter reaching the BFC threshold, which may trigger the base station 105-*a* to switch the UE 115-*a* to a different beam of the multiple active beams. In some cases where multiple beams are configured, the PHY layer 275 may provide the BFI indication to the MAC layer 270 when the BFC reaches the BFC threshold for all of the beams. The MAC layer 270 may count the received BFIs and may declare a beam failure and transmit a BFD 235 to the base station 105-*a* if the BFIs reach a BFI threshold (e.g., a maxCount threshold), and the base station 105-*a* may initiate a beam recovery procedure to establish one or more new active beams.

In some cases, the base station 105-*a* may configure one or more BFC parameters for use at the UE 115-*a* (e.g., that may be provided in configuration information 220). Such BFC parameters may include, for example, a BFC timer (e.g., a value "T" for a BFC timer duration), and a BFC threshold (e.g., a BFC threshold value for a count value of the BFC that triggers a L1 report 230 or BFI to the MAC layer 270). In some cases, the base station 105-*a* may configure multiple different values for the BFC parameters, and one of the multiple different values may be selected or switched (e.g., using a MAC-CE or DCI) based on channel conditions at the UE 115-*a*.

As discussed, in some cases, the UE 115-*a* may declare a beam failure based on one or more beam failure declaration criteria. For example, the MAC layer 270 may determine to transmit a BFD 235 to the base station 105-*a* based on a BFI threshold (e.g., a maxCount threshold). In accordance with various aspects, the UE 115-*a* may use an adaptive BFI threshold for declaring beam failure. In some cases, the adaptive BFI threshold may be adjusted based on measured channel conditions and machine learning that is used to determine an associated BFI threshold value. Such adaptive BFI thresholds may improve BFD reaction time, and reduce UE 115-*a* processing delay because there is no need to wait for updated configuration from the base station 105-*a*. Additionally, such an adaptive BFI threshold may relax base station 105-*a* processing due to fewer resources that are needed to control the UE 115-*a*. In some cases, machine learning techniques may correlate reference signal measurements to beam failures based on observations at the UE and adjust the BFI threshold accordingly, which may improve beam failure detection accuracy and, for example, allow the UE 115-a to differentiate temporary interference from more persistent noise in BFI determinations.

In one example, the UE 115-a may implement interference-aware adaptive BFI threshold (e.g., maxCount threshold) techniques in which a current maxCount value (e.g., maxCount=C) may be adjusted based on a number of consecutive BFIs that are reported by the PHY layer 275 in consecutive reference signal monitoring occasions. For example, maxCount=f(BFI_count), where maxCount>C when consecutive BFI_count is less than a threshold value, and maxCount<C when consecutive BFI_count is at or above the threshold value). Such an example may be written as, for example:

$$\text{maxCount} = \begin{cases} C + a, & \text{for } consecutiveBFI_{count} < \text{threshold} \\ C - b, & \text{for } consecutiveBFI_{count} \geq \text{threshold} \end{cases}$$

where a, b>0.

In such cases, if a non-consecutive BFI is reported, the value of maxCount may be reset to a default value (e.g., a configured maxCount that is provided in the configuration information 220), and may change again whenever consecutive BFI is reported. In such an example, a relatively small number of consecutive BFI may represent temporary interference, and thus their impact on beam failure declaration may be reduced, whereas if a number of consecutive BFI pass the threshold value it may represent more persistent channel issues and beam failure should be declared sooner. In some cases, the base station 105-a may configure multiple options of adaptive BFI threshold calculation methods for UE 115-a to autonomously choose (e.g., via RRC configuration, MAC-CE, DCI, or combinations thereof).

In some cases, the UE 115-a may be equipped with multiple options of BFI threshold calculation methods, which may be indicated to the base station 105-a with capability indication 215, for example. In some cases, machine learning may be used to adapt the BFI threshold based on prior BFI reports and associated channel measurements (e.g., SINR, SNR, RSRP, interference), where a machine learning algorithm (e.g., a neural network) may output the updated BFI threshold. In some cases, based on the UE 115-a capability and algorithm chosen, the output may be directly beam failure declaration or not, rather than an adjusted BFI threshold. In some cases, the base station 105-a may configure multiple machine learning algorithms (e.g., via RRC, MAC-CE, DCI) and the UE 115-a may autonomously select which to use.

Figure 3:
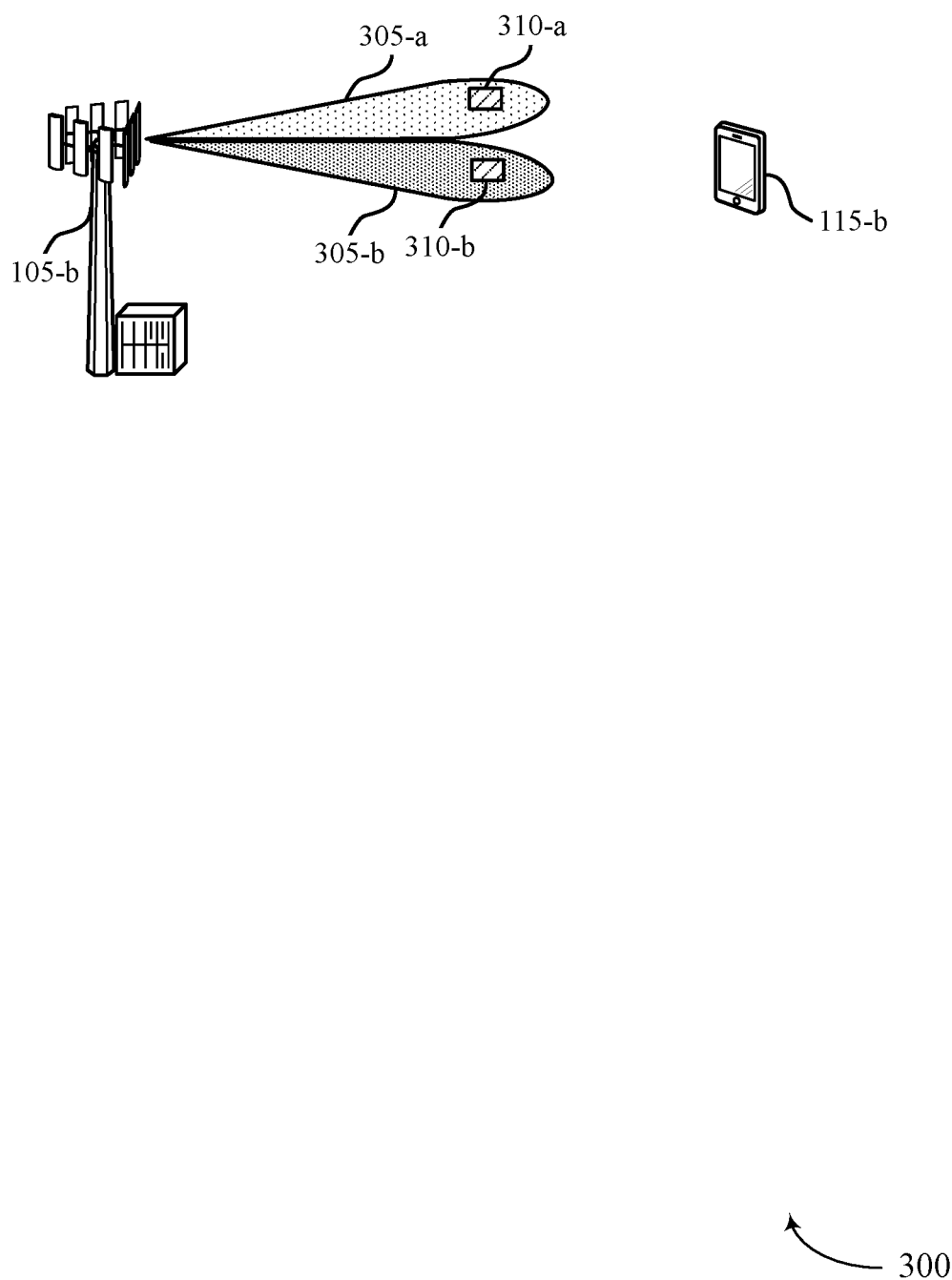
FIG. 3 illustrates an example of beams and associated measurements that support techniques for beam failure recovery in wireless communications in accordance with aspects of the present disclosure.

FIG. 3 illustrates an example of beams and associated measurements 300 that support techniques for beam failure recovery in wireless communications in accordance with aspects of the present disclosure. The example of FIG. 3 may be implemented in aspects of wireless communications systems 100 or 200 of FIG. 1 or 2. In the example of FIG. 3, a base station 105-b and UE 115-b may have multiple active beams, including a first beam 305-a and a second beam 305-b. The first beam 305-a and second beam 305-b may be established in accordance with beam training and establishment procedures.

In this example, a first reference signal 310-a may be transmitted using the first beam 305-a and a second reference signal 310-b may be transmitted using the second beam 305-b. In cases using traditional techniques, the UE 115-b measures the reference signal 310 for each beam 305, and estimates a corresponding BLER. In the event that a measurement parameter for all of the beams 305 is above or below an established threshold (e.g., if an estimated BLER>BLER_threshold), BFI is reported from physical layer to MAC layer. The MAC layer starts a BFD timer and counts BFI reports from the physical layer, and if BFI counts reach a BFI threshold (e.g., maxCount threshold) before the BFD timer expires, the MAC layer may declare a beam failure and the UE 115-b may initiate BFR procedures. As discussed herein, in cases where multiple beams 305 are established, the UE 115-b may use a separate L1-based procedure to address the case of a failure of one beam 305 (e.g., a failure of first beam 305-a). In such cases, if the first beam 305-a has a radio link quality that falls below a threshold (e.g., if the estimated BLER>threshold), the UE 115-b may transmit a L1 measurement report to switch beams 305 and use the second beam 305-b.

As discussed, simply transmitting such a L1 report based on a single instance of the radio link quality being below the threshold may result in cases where intermittent interference may cause frequent beam switching, which may increase uplink overhead (e.g., from additional L1 reports) and cause inefficient resource utilization. Thus, BFC implementation in accordance with various aspects of the present disclosure may be enabled, which may trigger a L1 report, a BFI indication, or both, based on a number of instances of the radio link quality being below the threshold meeting a BFC threshold. An example of such a technique is discussed with reference to FIG. 4.

Figure 4:
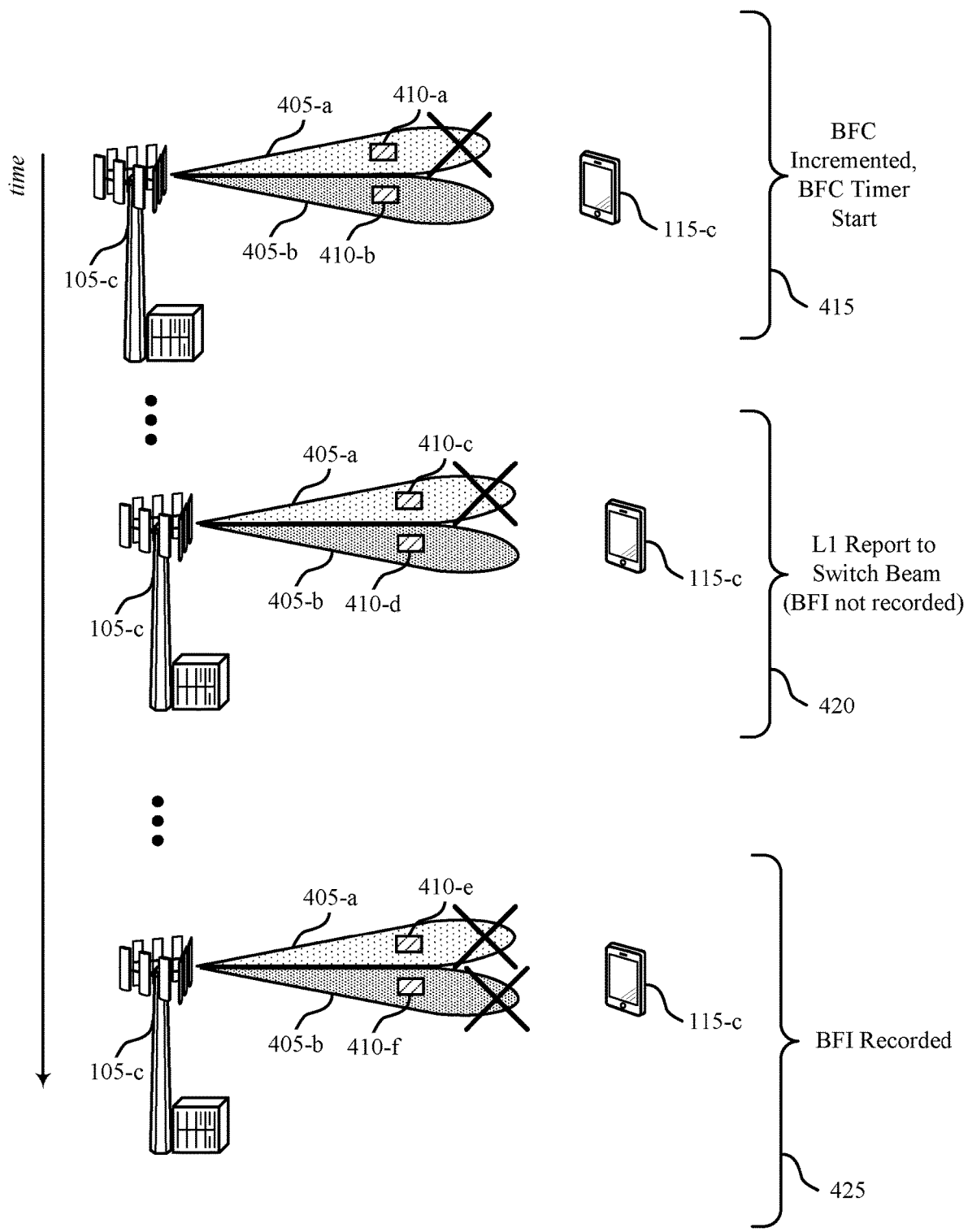
FIG. 4 illustrates an example of beam failure scenarios that support techniques for beam failure recovery in wireless communications in accordance with aspects of the present disclosure.

FIG. 4 illustrates an example of a beam failure scenarios 400 that support techniques for beam failure recovery in wireless communications in accordance with aspects of the present disclosure. The example of FIG. 4 may be implemented in aspects of wireless communications systems 100 or 200 of FIG. 1 or 2. In the example of FIG. 4, a base station 105-c and UE 115-c may have multiple active beams, including a first beam 405-a and a second beam 405-b. The first beam 405-a and second beam 405-b may be established in accordance with beam training and establishment procedures.

In this example, a partial beam failure recovery may be implemented in cases where one beam 405 fails, that uses a beam failure counter (BFC) to determine L1 report triggering condition (and optionally BFI reporting). In this example, at a first point in time 415 a first BFD-RS 410-a of the first beam 405-a may have an associated parameter that is more than or equal to a threshold value (e.g., BLER-≥BLER threshold) indicating a potential beam failure, and a second BFD-RS 410-b of the second beam 405-b has a respective parameter that does not indicate beam failure. The UE 115-b may, at the first point in time 415, increase BFC by one and start BFC timer (T). If the value of the BFC reaches BFC threshold before BFC timer expires, the UE 115-c may declare L1-based beam failure for the specific beam. In this example, at second point in time 420, the UE 115-c may have recorded BFCs that reach the BFC threshold and may thus transmit an L1 report to the base station 105-c that prompts a beam switch to the second beam 405-b. The UE 115-c may then reset BFC and BFC timer (T). As discussed, such a technique may avoid relatively frequent beam switch requests that may be caused by inaccurate channel condition estimation, and thereby save uplink overhead, resources, and power consumption.

Further, in the example of FIG. 4, the BFC may be applied in conjunction with BFI reporting. For example, in the event that all beams 405 have an associated measurement parameter that is more than or equal to a threshold value (e.g., BLER>BLER_threshold), and each corresponding BFC reaches BFC threshold, the UE 115-c may record a BFI, such as indicated at the third point in time 425 in which all beams 405 have failed. In some cases, the BFC may be enabled at the UE 115-c only when one active beam is configured. In other cases, BFC may be enabled for all beams or for a subset of the active beams at the UE 115-c (e.g., based on expected interference at one or more beams). Techniques such as enabling a BFC and BFC timer may, in some cases, reduce a number of erroneous BFI reports due to inaccurate channel estimation, which may reduce unnecessary BFI reporting from the PHY layer to the MAC layer and provide a corresponding decrease in power and resource consumption.

Figure 5:
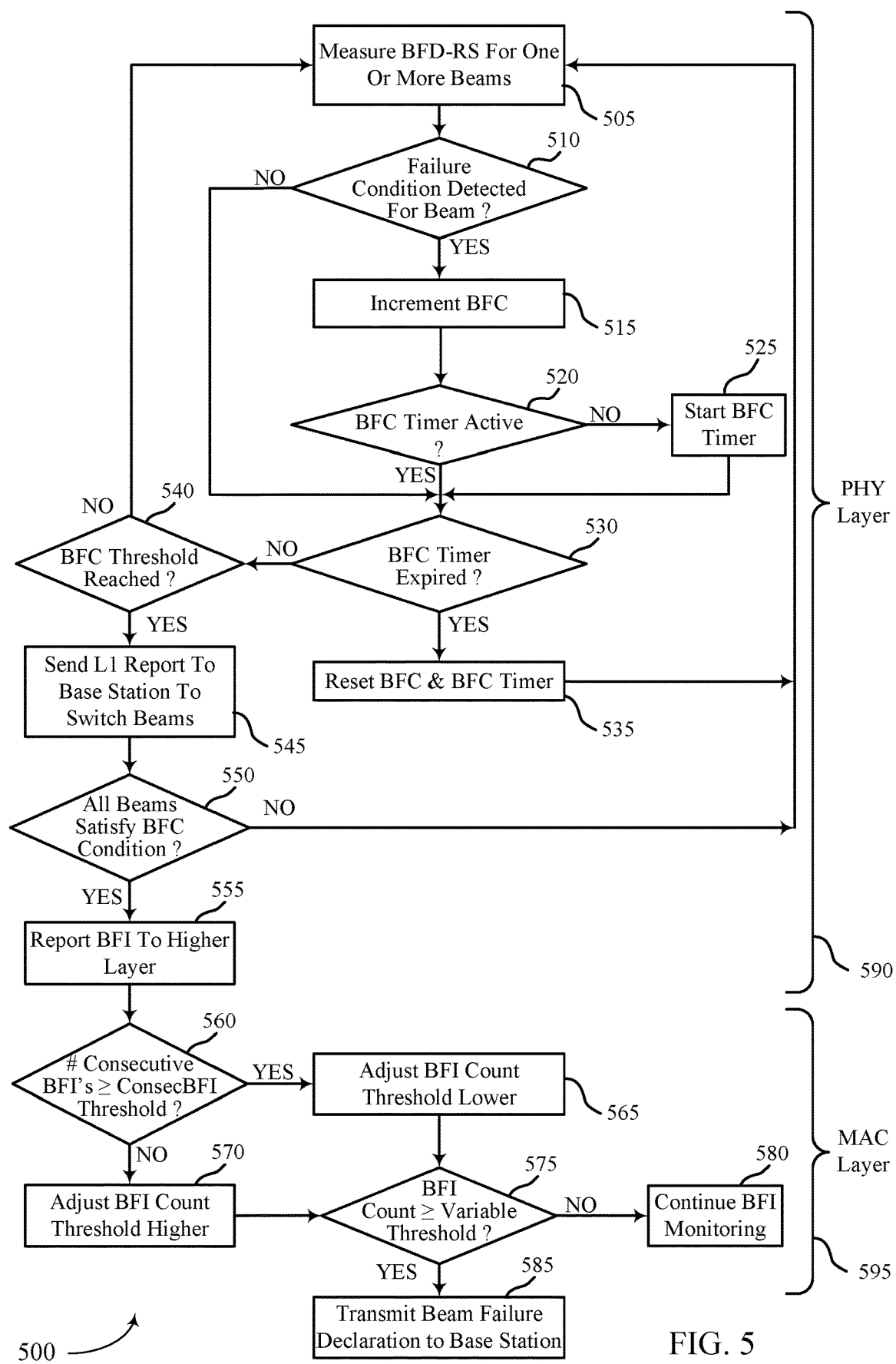
FIG. 5 illustrates an example of a flow chart for beam failure recovery in wireless communications in accordance with aspects of the present disclosure.

FIG. 5 illustrates an example of a method 500 for beam failure declaration and recovery in wireless communications in accordance with aspects of the present disclosure. The operations of the method 500 may be implemented by a UE or its components as described herein. For example, the operations of the method 500 may be performed by a UE 115 as described with reference to FIGS. 1 through 4. In some examples, a UE may execute a set of instructions to control the functional elements of the UE to perform the described functions. Additionally or alternatively, the UE may perform aspects of the described functions using special-purpose hardware. Operations shown and discussed in the example of FIG. 5 may be performed in a different order than the example order shown, or the operations performed may be performed in different orders or at different times. Some operations may be combined or omitted and other operations may be added to the method 500.

In this example, at 505, the UE may measure a BFD-RS for one or more beams. For example, the UE may measure a parameter (e.g., a RSRP, SINR, SNR, etc.) of a BFD-RS that is transmitted by a base station (e.g., a CSI-RS, SSB, DMRS, or other reference signal that may be transmitted by the base station). In some cases, the BFD-RS may be measured for each of multiple active beams that are configured for communications between the UE and the base station.

At 510, the UE may determine if a failure condition is detected for the beam. The failure condition may be determined based on a measurement parameter and associated measurement of the BFD-RS, or a parameter that is derived from one or more measurements (e.g., BLER that is determined based on SINR of a BFD-RS). In some cases, the failure condition may be based on a measurement parameter and an associated threshold value for the measurement parameter (e.g., if a BLER>BLER_threshold, SINR≤SINR threshold, SNR≤SNR threshold, RSSI≤RSSI threshold, pathloss>pathloss threshold, interference>interference threshold, RSRP≤RSRP threshold, or any combinations thereof).

At 515, when the failure condition is detected for the beam, the UE may increment a BFC value. At 520, the UE may determine whether a BFC timer is active and, if not, the UE may start the BFC timer at 525. If the BFC timer is active, or if the failure condition was not detected at 510, the UE may determine whether the BFC timer is expired, at 530. If the BFC timer has expired, at 535 the UE may reset the BFC and BFC timer, and operations at 505 may be continued.

At 540, is the BFC timer has not expired, the UE may determine if the BFC threshold has been reached. In some cases, the BFC threshold may be provided to the UE by the base station (e.g., in RRC information, a MAC-CE, DCI, or any combinations thereof). In other cases, the BFC threshold may be determined by the UE (e.g., based on channel conditions associated with certain BFC thresholds). In some cases, the base station may configure multiple different values for the BFC threshold and one or more failure condition parameters, and one of the configured values may be selected (e.g., autonomously at the UE, or based on MAC-CE or DCI signaling from the base station). If the BFC threshold has not been reached, operations at 505 may be continued.

At 545, if it is determined that the BFC threshold has been reached, the UE may send a L1 measurement report to the base station to initiate a beam switch to another active beam that is configured at the UE. At 550, the UE may determine if all beams satisfy BFC conditions. In the event that not all beams satisfy BFC conditions, the operations at 505 may be continued. In the event that all beams satisfy BFC conditions, at 555 a BFI may be reported to a higher layer. In this example, the operations of 505 through 555 may be performed at a PHY layer 590 of the UE.

At 560, based on the reported BFI, a MAC layer 595 at the UE may determine if a number of consecutive BFIs meet or exceed a consecutive BFI threshold. At block 565, if the number of consecutive BFIs meet or exceed the consecutive BFI threshold, the adaptive BFI threshold may be adjusted to be a lower value. In such a manner, consecutive BFIs may trigger a beam failure declaration more quickly. At 570, if the number of consecutive BFIs are less than the consecutive BFI threshold, the adaptive BFI threshold may be adjusted to be a higher value. In such a manner, a beam failure declaration may be triggered more slowly until the threshold number of consecutive BFIs are reported. In some cases, if the BFI is not a consecutive BFI and one or more BFC-RS measurement occasions intervene between BFIs, the BFI count threshold may be reset to a configured or default value.

At 575, the MAC layer 595 may determine if the BFI count is equal to or greater than the current value of the variable BFI threshold. At 580, if the BFI count is less than the current value of the variable BFI threshold, the MAC layer 595 may continue BFI monitoring. In some cases, a BFI timer may be started and if the BFI timer expired prior to the BFI count reaching the variable BFI threshold, the BFI counts and BFI timer may be reset. At 585, if it is determined that the BFI count meets or exceeds the current value of the variable BFI threshold, the MAC layer 595 may transmit a beam failure declaration to the base station and initiate beam failure recovery procedures. As discussed herein, in some cases the MAC layer may autonomously determine values for the variable BFI threshold, for the consecutive BFI threshold, or both.

Figure 6:
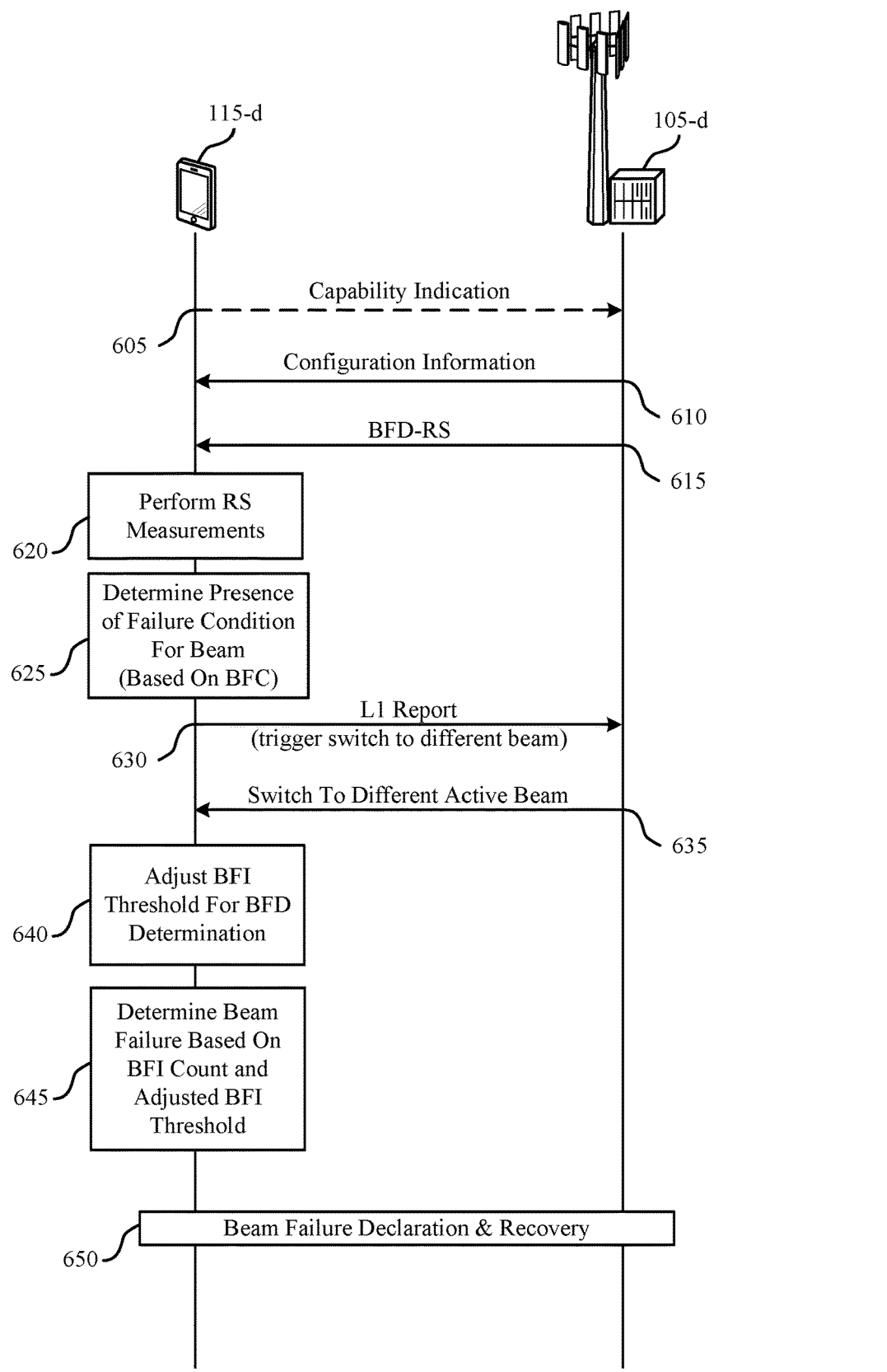
FIG. 6 illustrates an example of a process flow that supports techniques for beam failure recovery in wireless communications in accordance with aspects of the present disclosure.

FIG. 6 illustrates an example of a process flow 600 that supports techniques for beam failure recovery in wireless communications in accordance with aspects of the present disclosure. Process flow 600 includes a UE 115-d, which may be an example of a UE 115 described with reference to FIGS. 1 through 4. Process flow 600 also includes a base station 105-d, which may be an example of a base station 105 described with reference to FIGS. 1 through 4. The process flow 600 may implement aspects of wireless communications system 100 or 200.

In the following description of the process flow 600, the signaling exchanged between the UE 115-d and the base station 105-d may be exchanged in a different order than the example order shown, or the operations performed by the UE 115-d and the base station 105-d may be performed in different orders or at different times. Some operations may also be omitted from the process flow 600, and other operations may be added to the process flow 600.

Optionally, at 605, the UE 115-d may transmit a capability indication to the base station 105-d. The capability indication may indicate a UE capability to perform autonomous beam failure threshold setting. In some cases, the capability indication may provide an indication of supported machine learning features, processing power and capacity, memory capacity, computation resources, or any combinations thereof.

At 610, the UE 115-d may receive, from the base station 105-d, configuration information that may configure one or more parameters associated with beam failure detection and declaration. In some cases, the configuration information may include one or more parameter threshold values for determining a beam failure condition, an indication of a level of autonomy with which the UE 115-d is to manage beam failure detection operations, or any combinations thereof. The UE 115-d may receive the configuration information via RRC, DCI, or a MAC-CE.

At 615, the UE 115-d may receive one or more BFD-RSs from the base station 105-d. At 620, the UE 115-d may perform one or more reference signal measurements. In some cases, the reference signal measurements may include measurements of one or more parameters, derivation of one or more parameters based on reference signal measurements (e.g., BLER based on RSRP, a supported data rate based on RSSI, etc.), or any combinations thereof.

At 625, the UE 115-d may perform determine a presence of a failure condition for one or more measured beams, based on a BFC as discussed herein. At 630, the UE 115-d, based on the presence of the failure condition, may transmit a L1 report to the base station 105-d to trigger a switch to a different active beam. At 635, the base station 105-d may switch the active beam to be a different beam based on the L1 report.

Based on the presence of the failure condition, the UE 115-d may also send, from a PHY layer at the UE 115-d to a MAC layer at the UE 115-d, an indication used to identify beam failure based on measurements performed on the one or more BFD-RSs. At 640, the UE 115-d may adjust a BFI threshold for BFD determination based on BFI indications from the UE 115-d, in accordance with techniques discussed herein. At 645, the UE 115-d may determine a beam failure based on the BFI count and the adjusted BFI threshold. At 650, the UE 115-d may transmit a beam failure declaration to the base station 105-d, and a beam failure declaration and recovery procedure may be performed.

Figure 7:
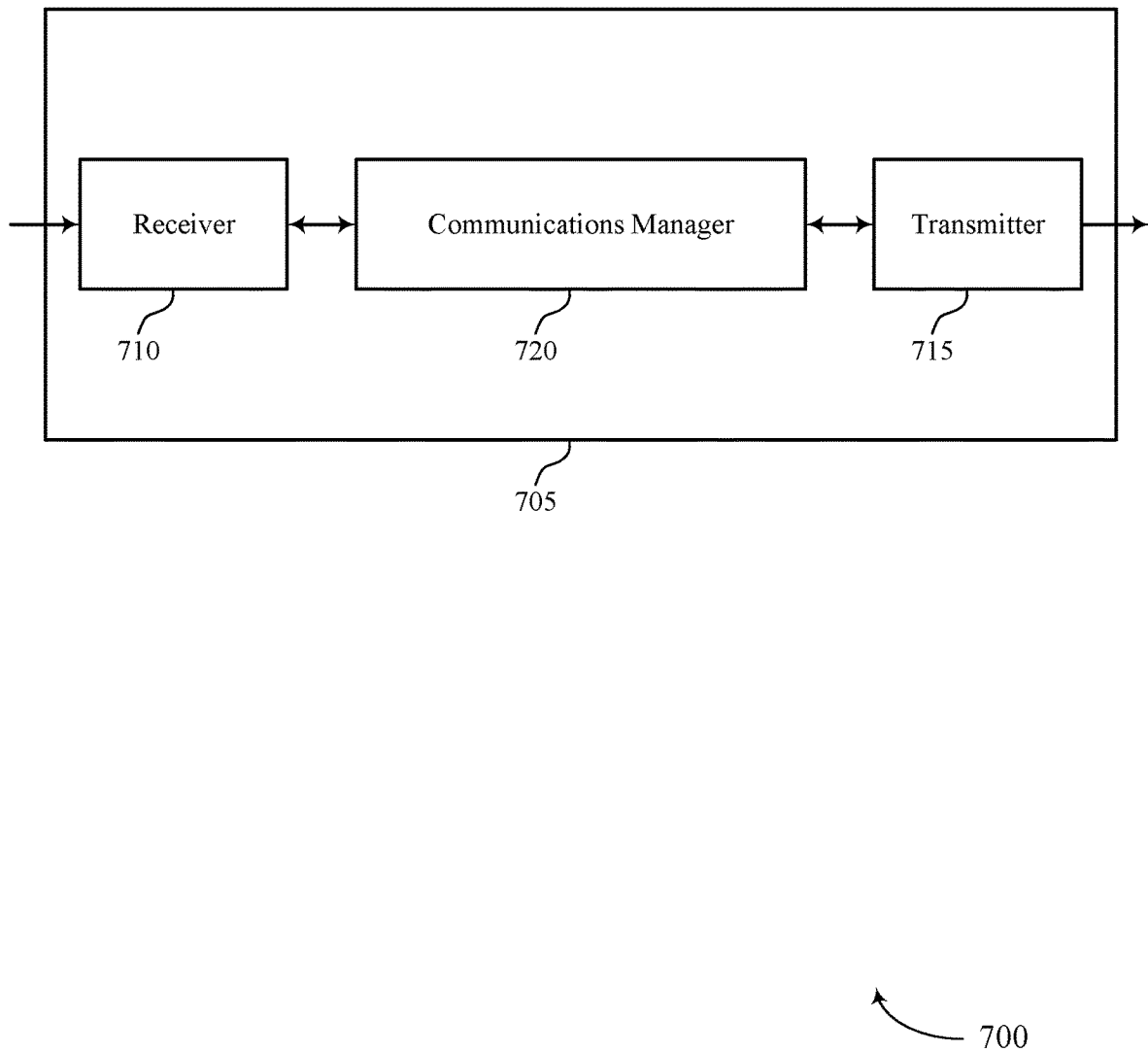
FIGS. 7 and 8 show block diagrams of devices that support techniques for beam failure recovery in wireless communications in accordance with aspects of the present disclosure.

FIG. 7 shows a block diagram 700 of a device 705 that supports techniques for beam failure recovery in wireless communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for beam failure recovery in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for beam failure recovery in wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for beam failure recovery in wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for measuring one or more reference signals transmitted by a base station on at least a first beam to obtain one or more reference signal measurements of the first beam. The communications manager 720 may be configured as or otherwise support a means for identifying a presence of a beam failure indication based on a beam failure count threshold and a number of the one or more reference signal measurements that are above a measurement threshold value. The communications manager 720 may be configured as or otherwise support a means for transmitting a beam failure declaration to the base station based on a number of instances of the beam failure indication and a variable threshold for triggering the beam failure declaration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and more efficient utilization of communication resources. In particular, a UE may be able to efficiently detect beam failure with higher reliability and in less time, with less control signaling from a base station. Because the control signaling may be reduced, the control overhead between the UE and the base station may be reduced, and processing delays associated with beam failure detection at the UE may also be reduced.

Figure 8:
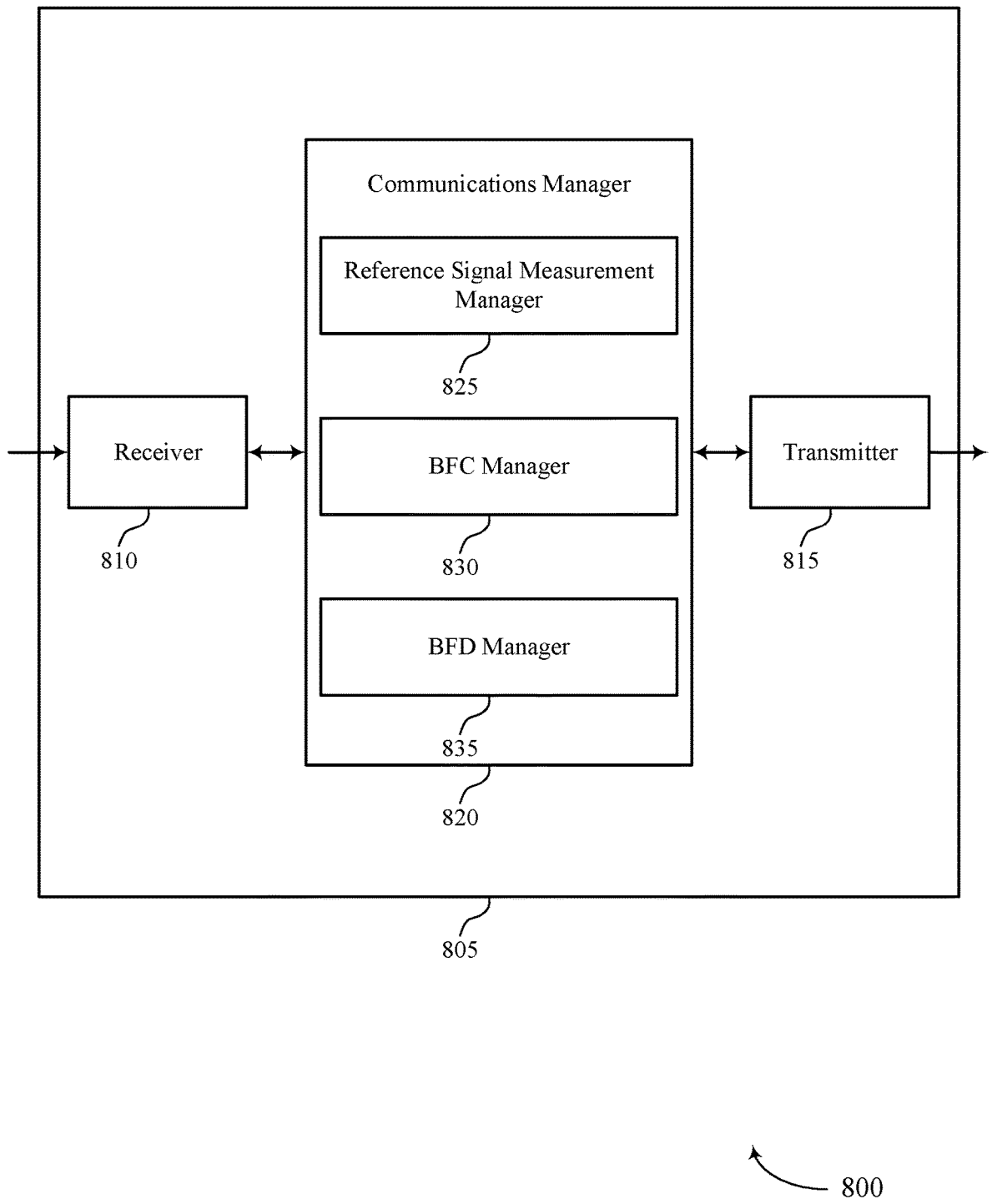

FIG. 8 shows a block diagram 800 of a device 805 that supports techniques for beam failure recovery in wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for beam failure recovery in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for beam failure recovery in wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for beam failure recovery in wireless communications as described herein. For example, the communications manager 820 may include a reference signal measurement manager 825, an BFC manager 830, an BFD manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The reference signal measurement manager 825 may be configured as or otherwise support a means for measuring one or more reference signals transmitted by a base station on at least a first beam to obtain one or more reference signal measurements of the first beam. The BFC manager 830 may be configured as or otherwise support a means for identifying a presence of a beam failure indication based on a beam failure count threshold and a number of the one or more reference signal measurements that are above a measurement threshold value. The BFD manager 835 may be configured as or otherwise support a means for transmitting a beam failure declaration to the base station based on a number of instances of the beam failure indication and a variable threshold for triggering the beam failure declaration.

Figure 9:
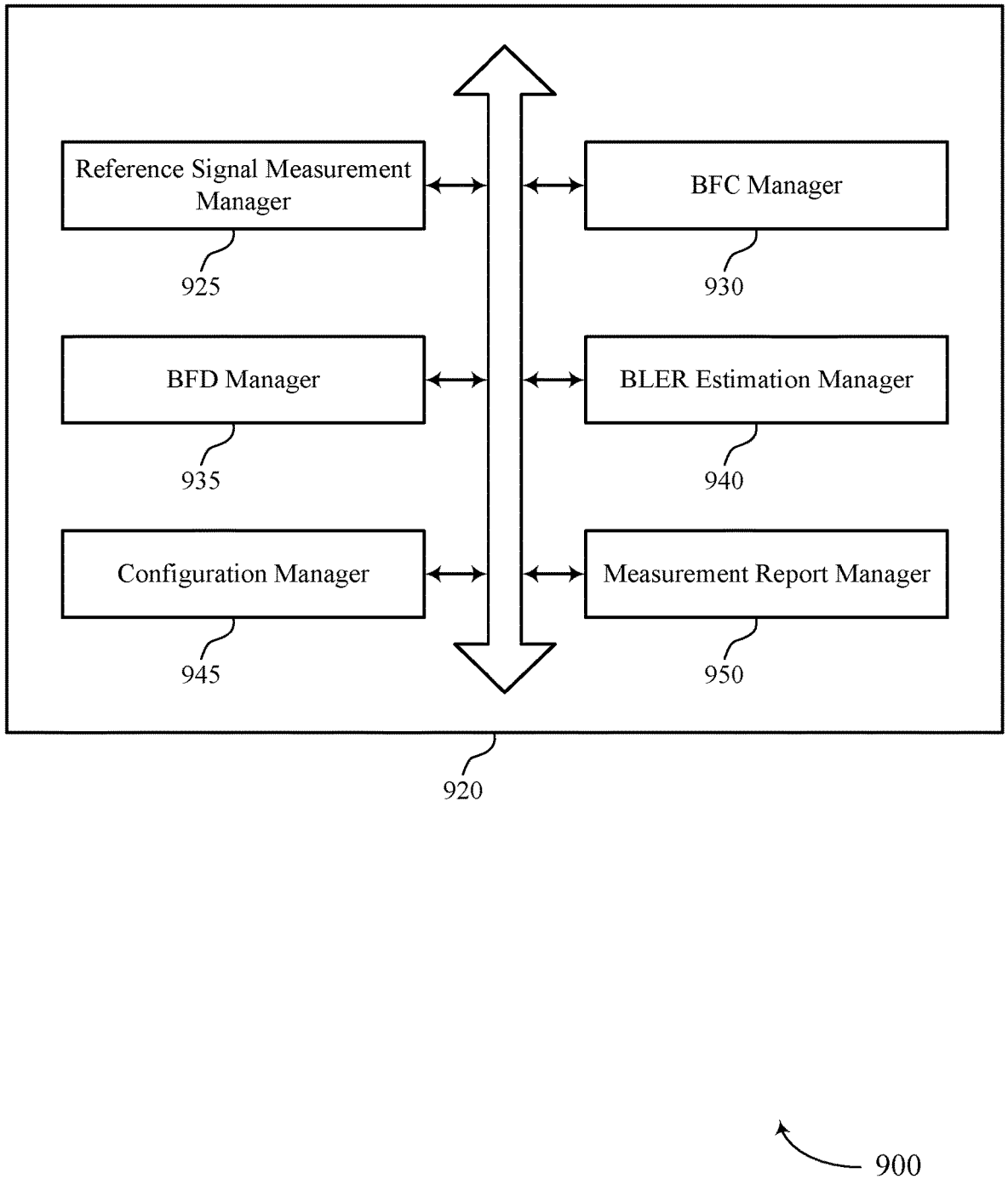
FIG. 9 shows a block diagram of a communications manager that supports techniques for beam failure recovery in wireless communications in accordance with aspects of the present disclosure.

FIG. 9 shows a block diagram 900 of a communications manager 920 that supports techniques for beam failure recovery in wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for beam failure recovery in wireless communications as described herein. For example, the communications manager 920 may include a reference signal measurement manager 925, an BFC manager 930, an BFD manager 935, a BLER estimation manager 940, a configuration manager 945, a measurement report manager 950, or any combination thereof. Each of these components may communicate, directly or indirectly, with one another (e.g., via one or more buses).

The communications manager 920 may support wireless communication at a UE in accordance with examples as disclosed herein. The reference signal measurement manager 925 may be configured as or otherwise support a means for measuring one or more reference signals transmitted by a base station on at least a first beam to obtain one or more reference signal measurements of the first beam. The BFC manager 930 may be configured as or otherwise support a means for identifying a presence of a beam failure indication based on a beam failure count threshold and a number of the one or more reference signal measurements that are above a measurement threshold value. The BFD manager 935 may be configured as or otherwise support a means for transmitting a beam failure declaration to the base station based on a number of instances of the beam failure indication and a variable threshold for triggering the beam failure declaration.

In some examples, the measuring and identifying are performed at a physical layer of the UE, and a MAC layer determines the variable threshold for triggering the beam failure declaration.

In some examples, to support measuring, the reference signal measurement manager 925 may be configured as or otherwise support a means for measuring a reference signal received power of the one or more reference signals. In some examples, to support measuring, the BLER estimation manager 940 may be configured as or otherwise support a means for determining a block error rate (BLER) estimate for communications with the base station on the first beam based on the reference signal received power.

In some examples, to support identifying the presence of the beam failure indication, the BFC manager 930 may be configured as or otherwise support a means for determining that the BLER estimate exceeds the measurement threshold value. In some examples, to support identifying the presence of the beam failure indication, the BFC manager 930 may be configured as or otherwise support a means for updating a beam failure count based on the determining that the BLER estimate exceeds the measurement threshold value. In some examples, to support identifying the presence of the beam failure indication, the BFC manager 930 may be configured as or otherwise support a means for initiating a beam failure count timer if the beam failure count timer is not running.

In some examples, to support identifying the presence of the beam failure indication, the BFC manager 930 may be configured as or otherwise support a means for determining, prior to an expiration of the beam failure count timer, that the updated beam failure count meets the beam failure count threshold. In some examples, to support identifying the presence of the beam failure indication, the measurement report manager 950 may be configured as or otherwise support a means for transmitting, to the base station, a L1 measurement report to trigger a beam switch from the first beam to a second beam, where the second beam is an established beam for communications with the base station prior to the measuring.

In some examples, the BLER estimate is determined for a single beam that is established for communications between the UE and the base station, and the beam failure indication is provided to a MAC layer when the updated beam failure count meets the beam failure count threshold prior to an expiration of the beam failure count timer. In some examples, the BLER estimate is determined for two or more beams that are established for communications between the UE and the base station and beam failure counts are maintained separately for each of the two or more beams, and the beam failure indication is provided to the MAC layer when the updated beam failure counts of each of the two or more beams meet the beam failure count threshold prior to expiration of the beam failure count timer. In some examples, the beam failure count threshold is selected from a first value or a second value based on channel conditions between the UE and the base station, the first value being less than the second value, and where the first value is selected based on identification of relatively poor channel conditions and the second value is selected based on identification of relatively good channel conditions.

In some examples, the configuration manager 945 may be configured as or otherwise support a means for receiving, from the base station, one or more beam failure parameters that indicate the beam failure count threshold, the measurement threshold value, a beam failure count timer value, or any combinations thereof. In some examples, the one or more beam failure parameters are received in RRC signaling, in a MAC-CE, in a downlink control information communication, or any combinations thereof.

In some examples, the configuration manager 945 may be configured as or otherwise support a means for transmitting, to the base station, a request to switch the one or more beam failure parameters in a MAC-CE, or an uplink control information communication. In some examples, the variable threshold is determined autonomously at the UE.

In some examples, the BFD manager 935 may be configured as or otherwise support a means for adjusting the variable threshold based on a number of consecutive BFIs that have been received from a physical layer of the UE for two or more reference signal measurement occasions.

In some examples, to support adjusting, the BFD manager 935 may be configured as or otherwise support a means for adjusting a BFI count threshold for triggering the beam failure declaration to be higher than an initial BFI count threshold value when the number of consecutive BFIs are less than a predetermined value. In some examples, to support adjusting, the BFD manager 935 may be configured as or otherwise support a means for adjusting the BFI count threshold to be lower than the initial BFI count threshold value when the number of consecutive BFIs are equal to or greater than the predetermined value.

In some examples, the variable threshold is determined based on one or more calculation procedures configured by the base station via RRC signaling, a MAC-CE, a DCI communication, or any combinations thereof. In some examples, the variable threshold is determined by a machine learning algorithm based on the one or more reference signal measurements of a SINR, a SNR, a RSRP, an interference measurement, or any combinations thereof.

In some examples, the configuration manager 945 may be configured as or otherwise support a means for transmitting, to the base station, a capability indication that the UE can perform autonomous adjustments of the variable threshold. In some examples, the configuration manager 945 may be configured as or otherwise support a means for receiving, from the base station, an activation or deactivation signal that activates or deactivates the autonomous adjustments of the variable threshold. In some examples, the capability indication is based on a machine learning capability of the UE, an amount of processing power or processing capacity available at the UE, an amount of memory available at the UE, an amount of available computation resources available at the UE, or any combinations thereof.

Figure 10:
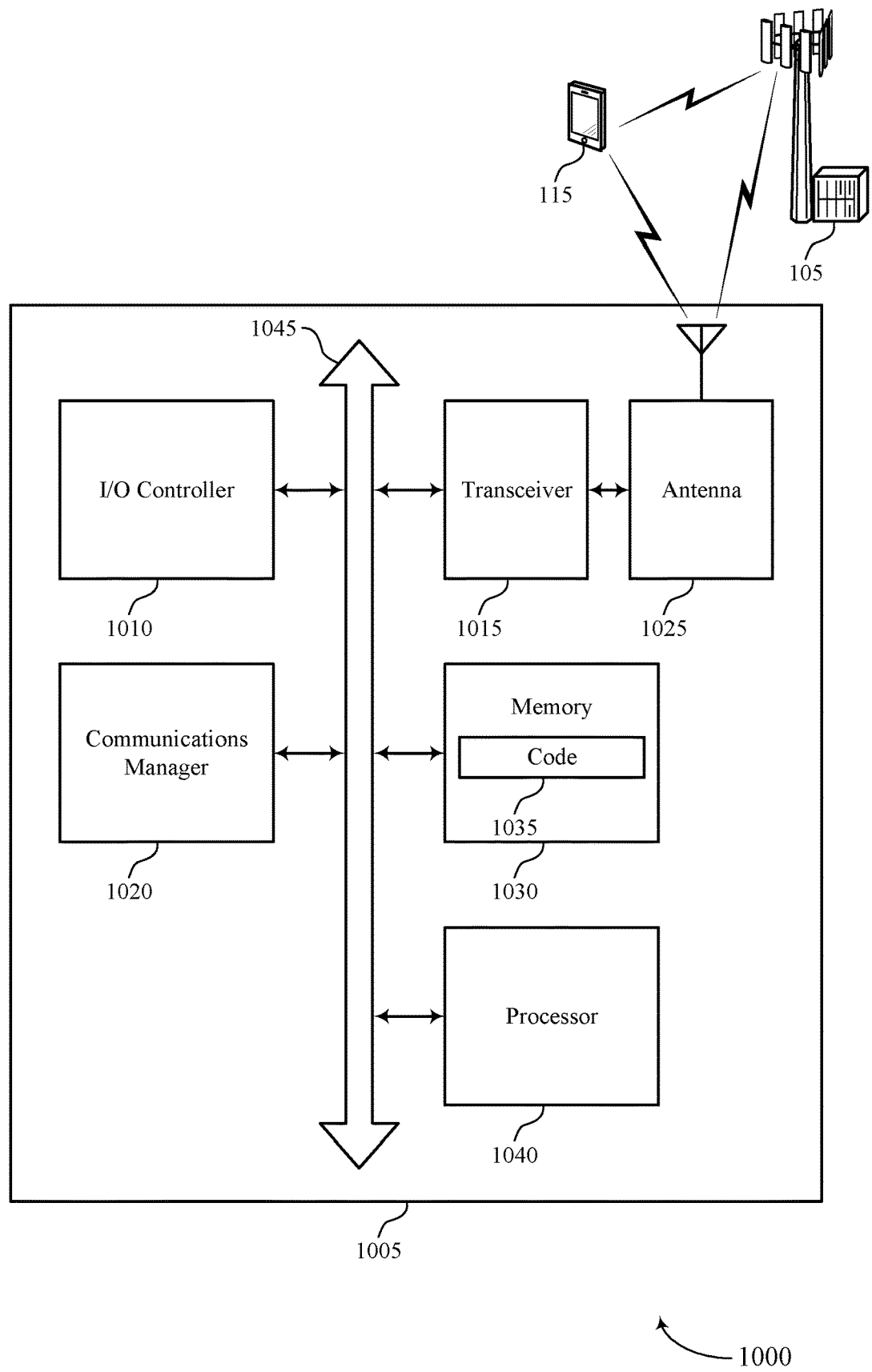
FIG. 10 shows a diagram of a system including a device that supports techniques for beam failure recovery in wireless communications in accordance with aspects of the present disclosure.

FIG. 10 shows a diagram of a system 1000 including a device 1005 that supports techniques for beam failure recovery in wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for beam failure recovery in wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for measuring one or more reference signals transmitted by a base station on at least a first beam to obtain one or more reference signal measurements of the first beam. The communications manager 1020 may be configured as or otherwise support a means for identifying a presence of a beam failure indication based on a beam failure count threshold and a number of the one or more reference signal measurements that are above a measurement threshold value. The communications manager 1020 may be configured as or otherwise support a means for transmitting a beam failure declaration to the base station based on a number of instances of the beam failure indication and a variable threshold for triggering the beam failure declaration.

By including or configuring the communications manager 1020 in accordance with examples as described herein, the device 1005 may support techniques for reduced processing and more efficient utilization of communication resources. In particular, a UE may be able to efficiently detect beam failure with higher reliability and in less time, with less control signaling from a base station. Because the control signaling may be reduced, the control overhead between the UE and the base station may be reduced, and processing delays associated with beam failure detection at the UE may also be reduced.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for beam failure recovery in wireless communications as described herein, or the processor 1040 and the memory 1030 may be otherwise configured to perform or support such operations.

Figure 11:
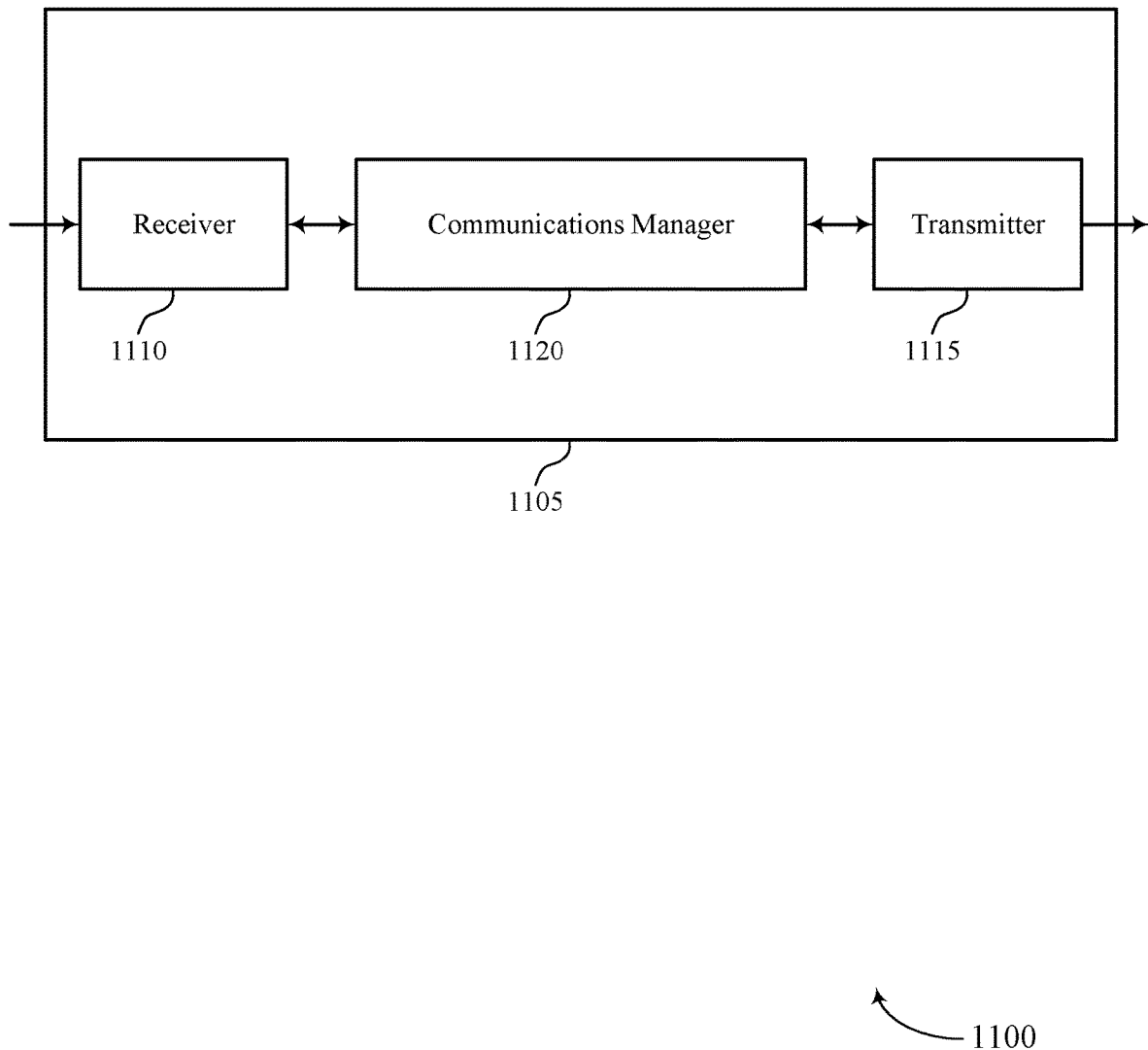
FIGS. 11 and 12 show block diagrams of devices that support techniques for beam failure recovery in wireless communications in accordance with aspects of the present disclosure.

FIG. 11 shows a block diagram 1100 of a device 1105 that supports techniques for beam failure recovery in wireless communications in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for beam failure recovery in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for beam failure recovery in wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for beam failure recovery in wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting first control information to a UE that configures beam failure indications based on a beam failure count threshold and a number of reference signal measurements that are above a measurement threshold value for at least a first beam. The communications manager 1120 may be configured as or otherwise support a means for transmitting second control information to the UE that configures reporting of a beam failure declaration based on an amount of beam failure indications and a variable threshold for the beam failure declaration. The communications manager 1120 may be configured as or otherwise support a means for transmitting one or more reference signals to the UE via the first beam. The communications manager 1120 may be configured as or otherwise support a means for receiving, from the UE responsive to the one or more reference signals, one or more of a measurement report or the beam failure declaration that indicates communications with the UE are to be switched from the first beam to a second beam.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing and more efficient utilization of communication resources. In particular, a UE may be configured to efficiently detect beam failure with higher reliability and in less time, with less control signaling from a base station. Because the control signaling may be reduced, the control overhead between the UE and the base station may be reduced, and processing delays associated with beam failure detection at the UE may also be reduced.

Figure 12:
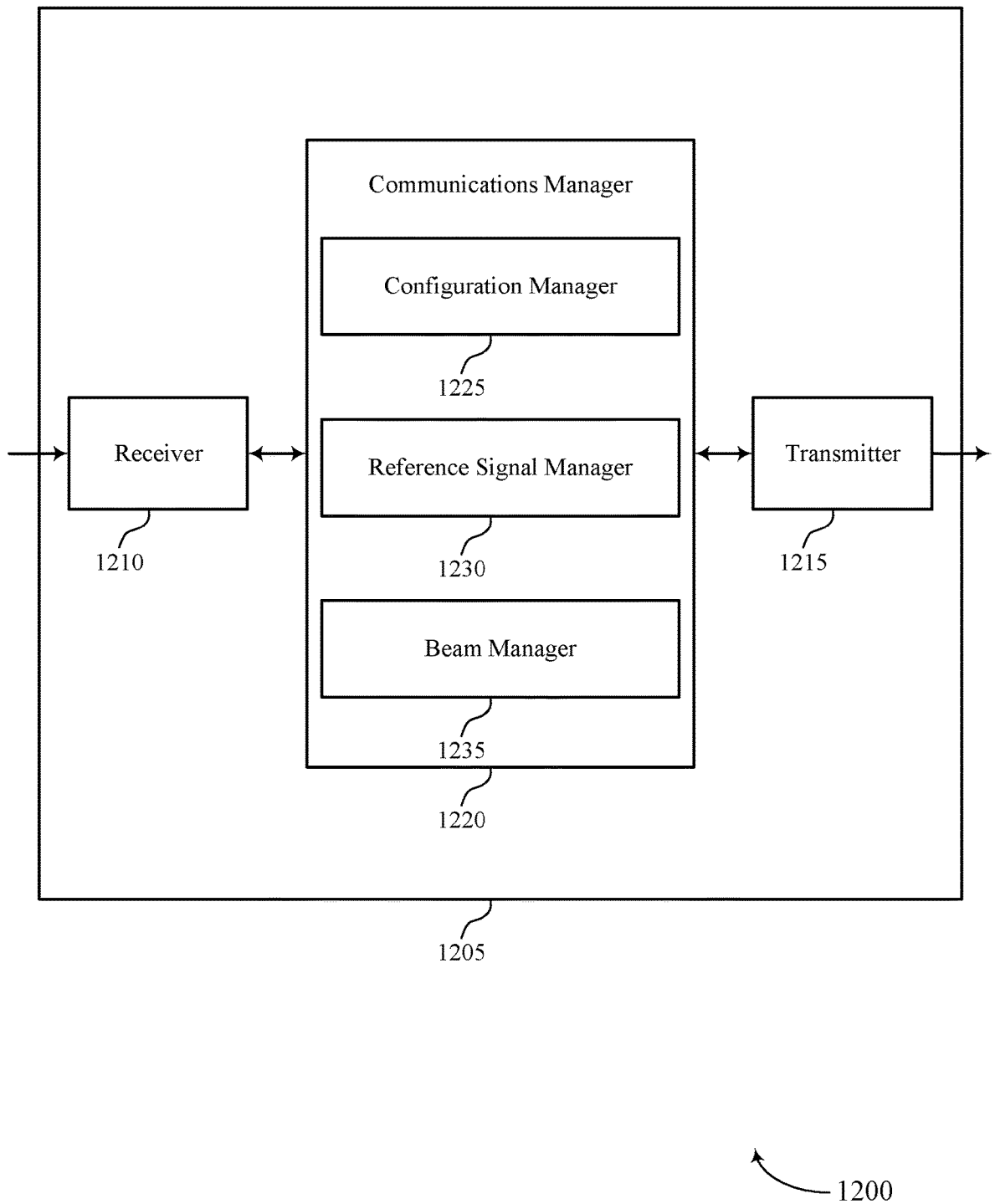

FIG. 12 shows a block diagram 1200 of a device 1205 that supports techniques for beam failure recovery in wireless communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for beam failure recovery in wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for beam failure recovery in wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for beam failure recovery in wireless communications as described herein. For example, the communications manager 1220 may include a configuration manager 1225, a reference signal manager 1230, a beam manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The configuration manager 1225 may be configured as or otherwise support a means for transmitting first control information to a UE that configures beam failure indications based on a beam failure count threshold and a number of reference signal measurements that are above a measurement threshold value for at least a first beam. The configuration manager 1225 may be configured as or otherwise support a means for transmitting second control information to the UE that configures reporting of a beam failure declaration based on an amount of beam failure indications and a variable threshold for the beam failure declaration. The reference signal manager 1230 may be configured as or otherwise support a means for transmitting one or more reference signals to the UE via the first beam. The beam manager 1235 may be configured as or otherwise support a means for receiving, from the UE responsive to the one or more reference signals, one or more of a measurement report or the beam failure declaration that indicates communications with the UE are to be switched from the first beam to a second beam.

Figure 13:
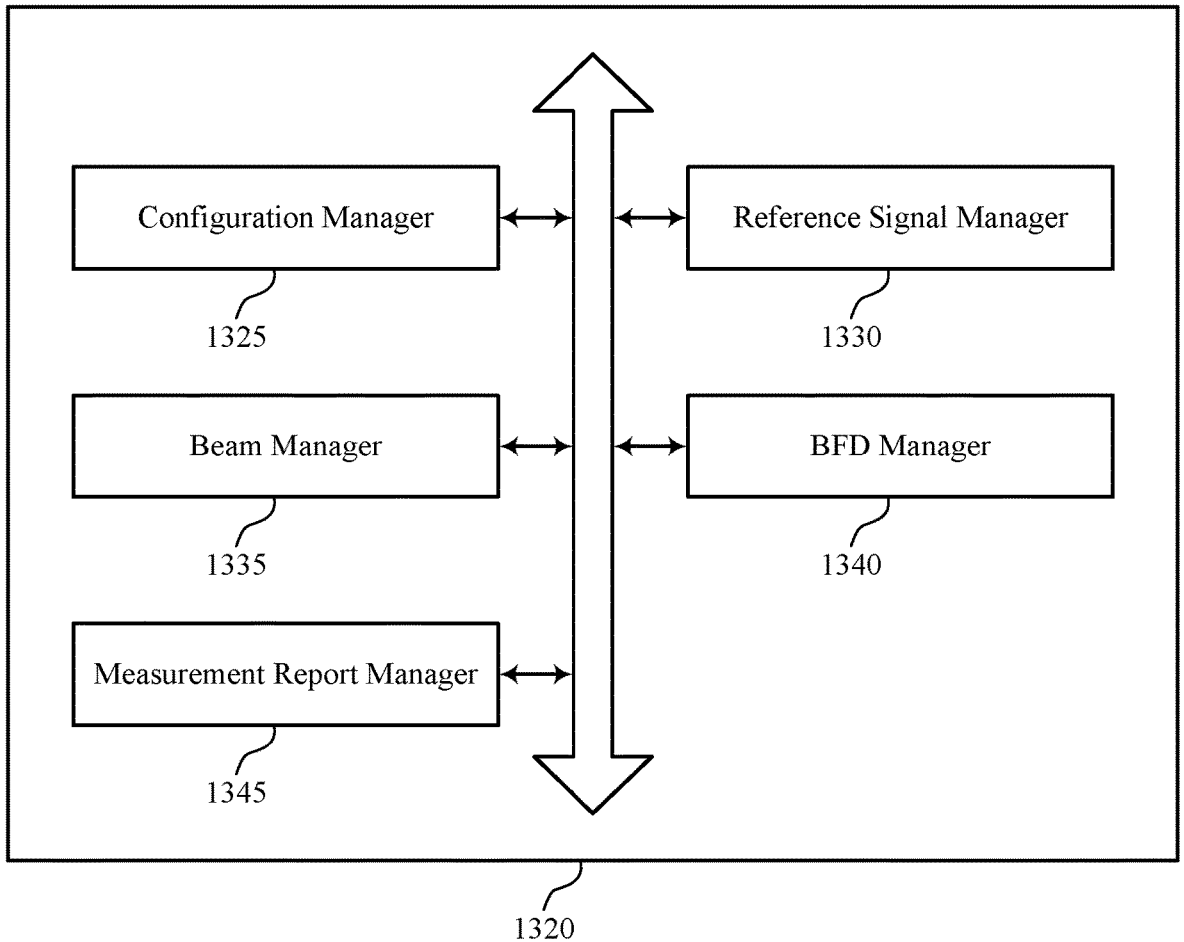
FIG. 13 shows a block diagram of a communications manager that supports techniques for beam failure recovery in wireless communications in accordance with aspects of the present disclosure.

FIG. 13 shows a block diagram 1300 of a communications manager 1320 that supports techniques for beam failure recovery in wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for beam failure recovery in wireless communications as described herein. For example, the communications manager 1320 may include a configuration manager 1325, a reference signal manager 1330, a beam manager 1335, an BFD manager 1340, a measurement report manager 1345, or any combination thereof. Each of these components may communicate, directly or indirectly, with one another (e.g., via one or more buses).

The communications manager 1320 may support wireless communication at a base station in accordance with examples as disclosed herein. The configuration manager 1325 may be configured as or otherwise support a means for transmitting first control information to a UE that configures beam failure indications based on a beam failure count threshold and a number of reference signal measurements that are above a measurement threshold value for at least a first beam. In some examples, the configuration manager 1325 may be configured as or otherwise support a means for transmitting second control information to the UE that configures reporting of a beam failure declaration based on an amount of beam failure indications and a variable threshold for the beam failure declaration. The reference signal manager 1330 may be configured as or otherwise support a means for transmitting one or more reference signals to the UE via the first beam. The beam manager 1335 may be configured as or otherwise support a means for receiving, from the UE responsive to the one or more reference signals, one or more of a measurement report or the beam failure declaration that indicates communications with the UE are to be switched from the first beam to a second beam.

In some examples, the first control information provides one or more beam failure parameters for use at a physical layer of the UE to estimate a BLER and update a beam failure count based on BLER estimates from the reference signal measurements. In some examples, the measurement report manager 1345 may be configured as or otherwise support a means for receiving, from the UE, a L1 measurement report to trigger a beam switch from the first beam to the second beam, where the second beam is an established beam for communications with the UE prior to the transmitting the one or more reference signals. In some examples, the variable threshold is determined autonomously at the UE.

In some examples, the second control information configures one or more calculation procedures and is transmitted to the UE via RRC signaling, a MAC-CE, a DCI communication, or any combinations thereof. In some examples, the configuration manager 1325 may be configured as or otherwise support a means for receiving, from the UE, a capability indication that the UE can perform autonomous adjustments of the variable threshold, and where the second control information is transmitted to the UE based on the capability indication.

Figure 14:
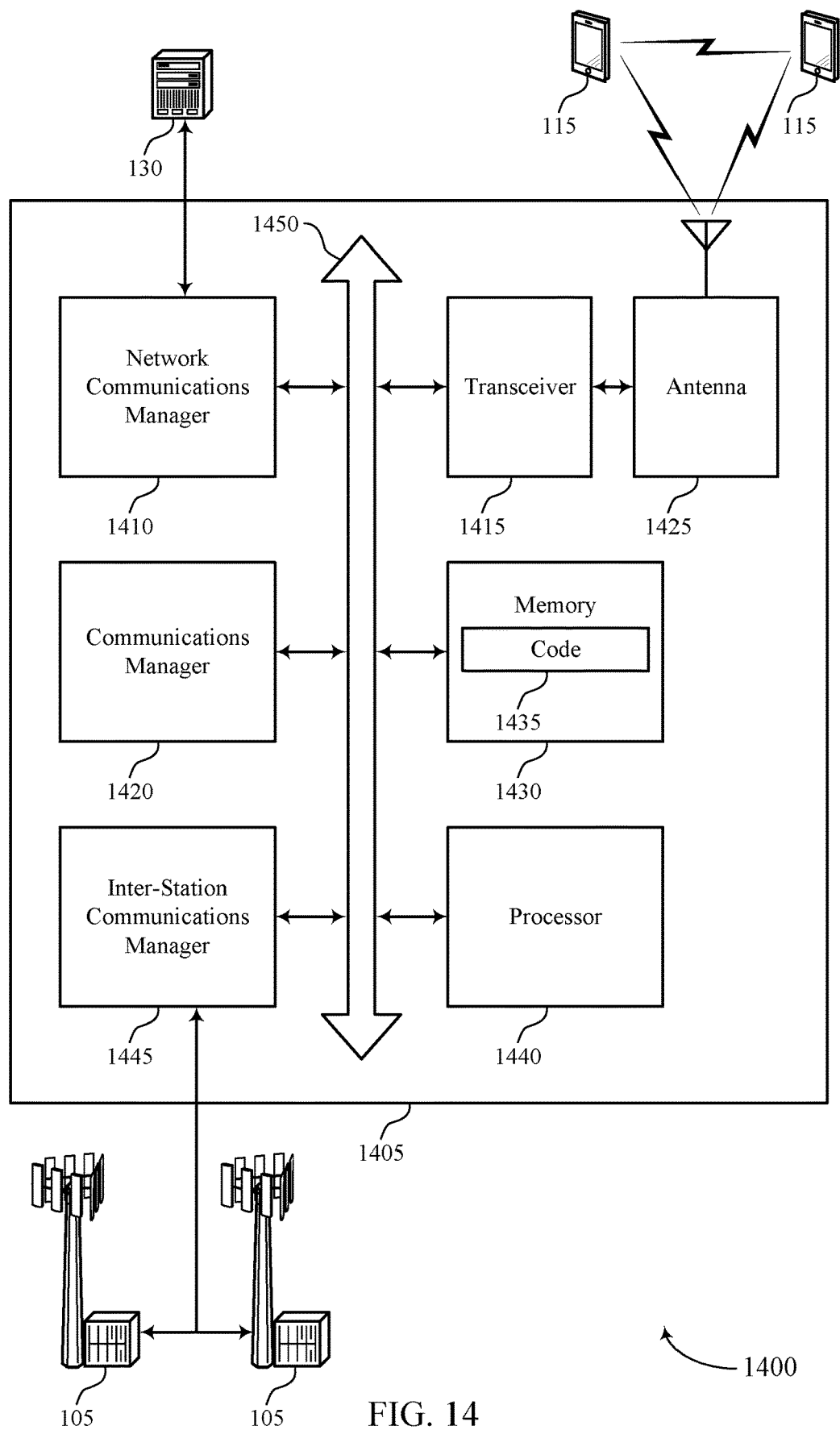
FIG. 14 shows a diagram of a system including a device that supports techniques for beam failure recovery in wireless communications in accordance with aspects of the present disclosure.

FIG. 14 shows a diagram of a system 1400 including a device 1405 that supports techniques for beam failure recovery in wireless communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for beam failure recovery in wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting first control information to a UE that configures beam failure indications based on a beam failure count threshold and a number of reference signal measurements that are above a measurement threshold value for at least a first beam. The communications manager 1420 may be configured as or otherwise support a means for transmitting second control information to the UE that configures reporting of a beam failure declaration based on an amount of beam failure indications and a variable threshold for the beam failure declaration. The communications manager 1420 may be configured as or otherwise support a means for transmitting one or more reference signals to the UE via the first beam. The communications manager 1420 may be configured as or otherwise support a means for receiving, from the UE responsive to the one or more reference signals, one or more of a measurement report or the beam failure declaration that indicates communications with the UE are to be switched from the first beam to a second beam.

By including or configuring the communications manager 1420 in accordance with examples as described herein, the device 1405 may support techniques for reduced processing and more efficient utilization of communication resources. In particular, a UE may be configured to efficiently detect beam failure with higher reliability and in less time, with less control signaling from a base station. Because the control signaling may be reduced, the control overhead between the UE and the base station may be reduced, and processing delays associated with beam failure detection at the UE may also be reduced.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for beam failure recovery in wireless communications as described herein, or the processor 1440 and the memory 1430 may be otherwise configured to perform or support such operations.

Figure 15:
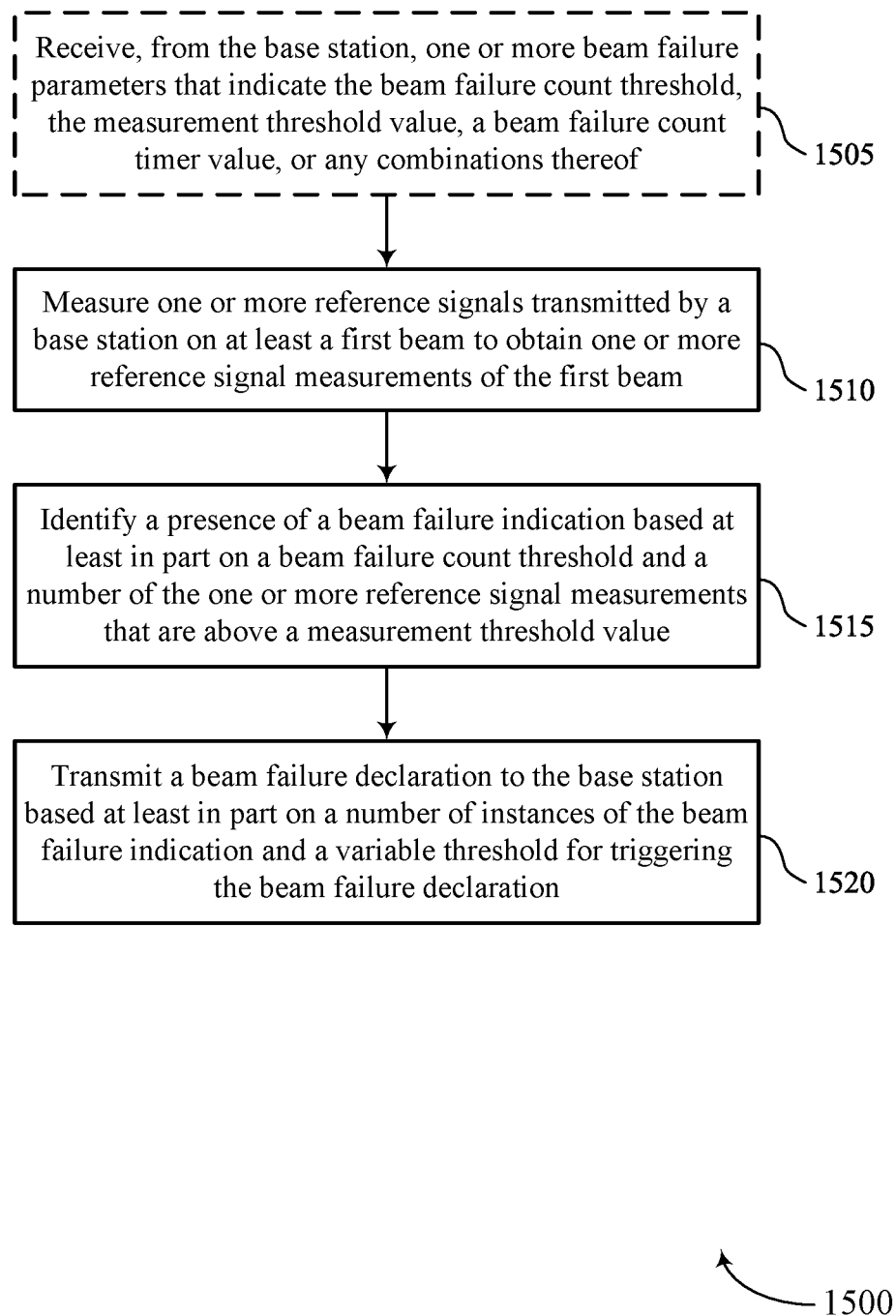
FIGS. 15 through 19 show flowcharts illustrating methods that support techniques for beam failure recovery in wireless communications in accordance with aspects of the present disclosure.

FIG. 15 shows a flowchart illustrating a method 1500 that supports techniques for beam failure recovery in wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

Optionally, at 1505, the method may include receiving, from the base station, one or more beam failure parameters that indicate the beam failure count threshold, the measurement threshold value, a beam failure count timer value, or any combinations thereof. The operations of 1505 may be performed in accordance with examples as disclosed herein. In some examples, aspects of the operations of 1505 may be performed by a configuration manager 945 as described with reference to FIG. 9.

At 1510, the method may include measuring one or more reference signals transmitted by a base station on at least a first beam to obtain one or more reference signal measurements of the first beam. The operations of 1510 may be performed in accordance with examples as disclosed herein. In some examples, aspects of the operations of 1510 may be performed by a reference signal measurement manager 925 as described with reference to FIG. 9.

At 1515, the method may include identifying a presence of a beam failure indication based on a beam failure count threshold and a number of the one or more reference signal measurements that are above a measurement threshold value. The operations of 1515 may be performed in accordance with examples as disclosed herein. In some examples, aspects of the operations of 1515 may be performed by an BFC manager 930 as described with reference to FIG. 9.

At 1520, the method may include transmitting a beam failure declaration to the base station based on a number of instances of the beam failure indication and a variable threshold for triggering the beam failure declaration. The operations of 1520 may be performed in accordance with examples as disclosed herein. In some examples, aspects of the operations of 1520 may be performed by an BFD manager 935 as described with reference to FIG. 9.

Figure 16:
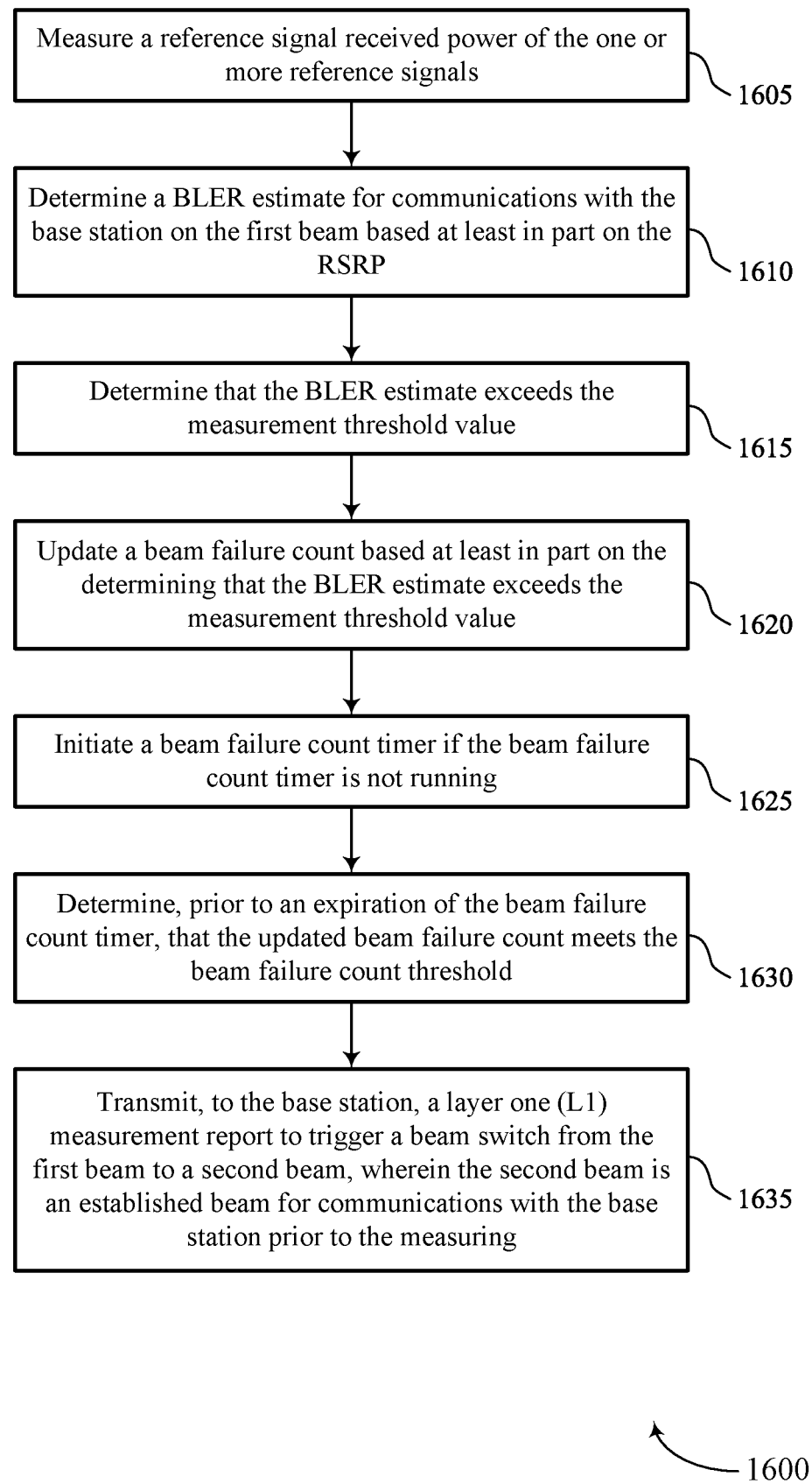

FIG. 16 shows a flowchart illustrating a method 1600 that supports techniques for beam failure recovery in wireless communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include measuring a reference signal received power of the one or more reference signals. The operations of 1605 may be performed in accordance with examples as disclosed herein. In some examples, aspects of the operations of 1605 may be performed by a reference signal measurement manager 925 as described with reference to FIG. 9.

At 1610, the method may include determining a BLER estimate for communications with the base station on the first beam based on the RSRP. The operations of 1610 may be performed in accordance with examples as disclosed herein. In some examples, aspects of the operations of 1610 may be performed by a BLER estimation manager 940 as described with reference to FIG. 9.

At 1615, the method may include determining that the BLER estimate exceeds the measurement threshold value. The operations of 1615 may be performed in accordance with examples as disclosed herein. In some examples, aspects of the operations of 1615 may be performed by an BFC manager 930 as described with reference to FIG. 9.

At 1620, the method may include updating a beam failure count based on the determining that the BLER estimate exceeds the measurement threshold value. The operations of 1620 may be performed in accordance with examples as disclosed herein. In some examples, aspects of the operations of 1620 may be performed by an BFC manager 930 as described with reference to FIG. 9.

At 1625, the method may include initiating a beam failure count timer if the beam failure count timer is not running. The operations of 1625 may be performed in accordance with examples as disclosed herein. In some examples, aspects of the operations of 1625 may be performed by an BFC manager 930 as described with reference to FIG. 9.

At 1630, the method may include determining, prior to an expiration of the beam failure count timer, that the updated beam failure count meets the beam failure count threshold. The operations of 1630 may be performed in accordance with examples as disclosed herein. In some examples, aspects of the operations of 1630 may be performed by an BFC manager 930 as described with reference to FIG. 9.

At 1635, the method may include transmitting, to the base station, a layer one (L1) measurement report to trigger a beam switch from the first beam to a second beam, where the second beam is an established beam for communications with the base station prior to the measuring. The operations of 1635 may be performed in accordance with examples as disclosed herein. In some examples, aspects of the operations of 1635 may be performed by a measurement report manager 950 as described with reference to FIG. 9.

Figure 17:
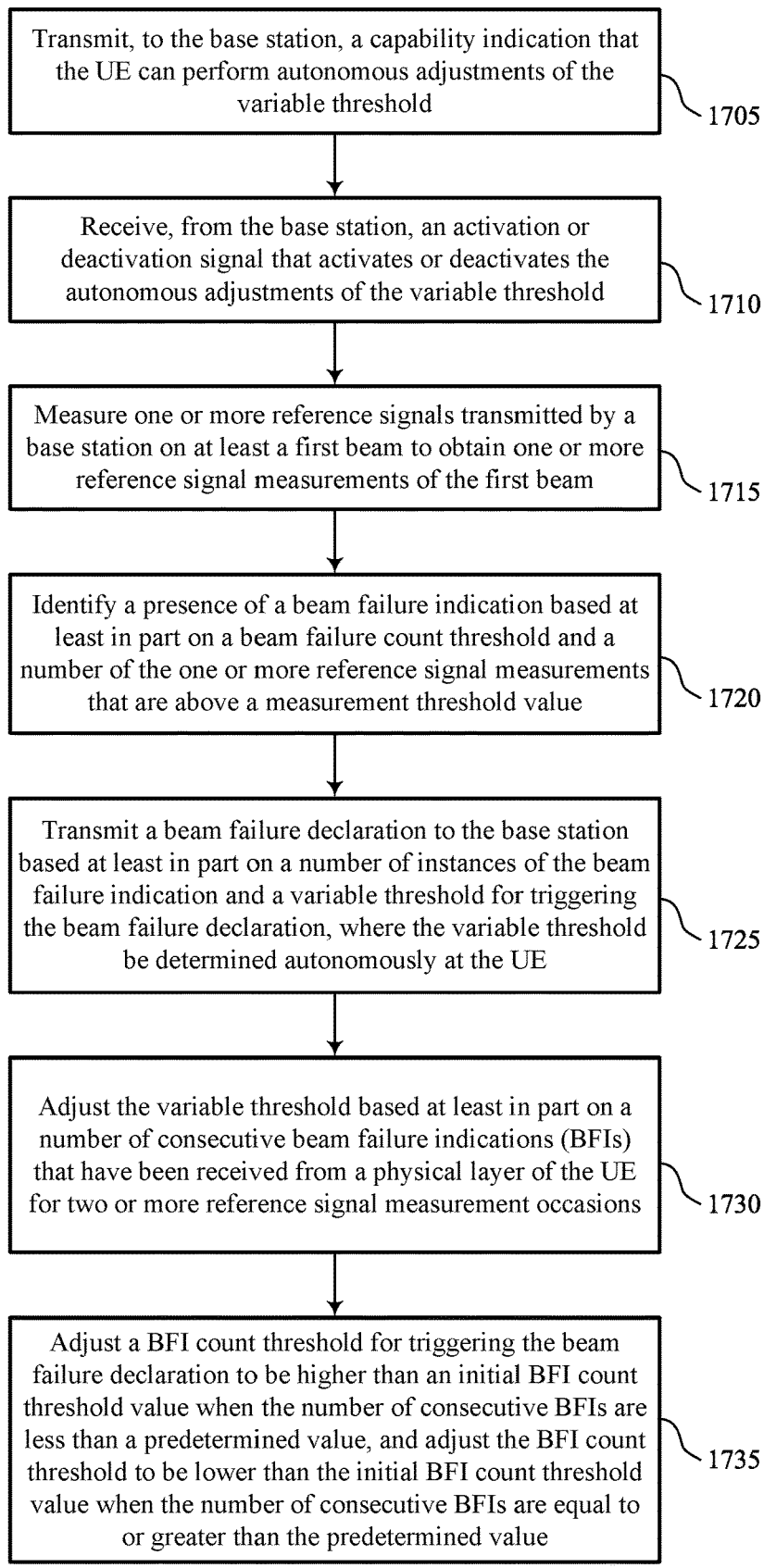

FIG. 17 shows a flowchart illustrating a method 1700 that supports techniques for beam failure recovery in wireless communications in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include transmitting, to the base station, a capability indication that the UE can perform autonomous adjustments of the variable threshold. The operations of 1705 may be performed in accordance with examples as disclosed herein. In some examples, aspects of the operations of 1705 may be performed by a configuration manager 945 as described with reference to FIG. 9.

At 1710, the method may include receiving, from the base station, an activation or deactivation signal that activates or deactivates the autonomous adjustments of the variable threshold. The operations of 1710 may be performed in accordance with examples as disclosed herein. In some examples, aspects of the operations of 1710 may be performed by a configuration manager 945 as described with reference to FIG. 9.

At 1715, the method may include measuring one or more reference signals transmitted by a base station on at least a first beam to obtain one or more reference signal measurements of the first beam. The operations of 1715 may be performed in accordance with examples as disclosed herein. In some examples, aspects of the operations of 1715 may be performed by a reference signal measurement manager 925 as described with reference to FIG. 9.

At 1720, the method may include identifying a presence of a beam failure indication based on a beam failure count threshold and a number of the one or more reference signal measurements that are above a measurement threshold value. The operations of 1720 may be performed in accordance with examples as disclosed herein. In some examples, aspects of the operations of 1720 may be performed by an BFC manager 930 as described with reference to FIG. 9.

At 1725, the method may include transmitting a beam failure declaration to the base station based on a number of instances of the beam failure indication and a variable threshold for triggering the beam failure declaration. The operations of 1725 may be performed in accordance with examples as disclosed herein. In some examples, aspects of the operations of 1725 may be performed by an BFD manager 935 as described with reference to FIG. 9. In some cases, the variable threshold is determined autonomously at the UE.

At 1730, the method may include adjusting the variable threshold based on a number of consecutive beam failure indications (BFIs) that have been received from a physical layer of the UE for two or more reference signal measurement occasions. The operations of 1730 may be performed in accordance with examples as disclosed herein. In some examples, aspects of the operations of 1730 may be performed by an BFD manager 935 as described with reference to FIG. 9.

At 1735, the method may include adjusting a BFI count threshold for triggering the beam failure declaration to be higher than an initial BFI count threshold value when the number of consecutive BFIs are less than a predetermined value, and adjusting the BFI count threshold to be lower than the initial BFI count threshold value when the number of consecutive BFIs are equal to or greater than the predetermined value. The operations of 1735 may be performed in accordance with examples as disclosed herein. In some examples, aspects of the operations of 1735 may be performed by an BFD manager 935 as described with reference to FIG. 9.

Figure 18:
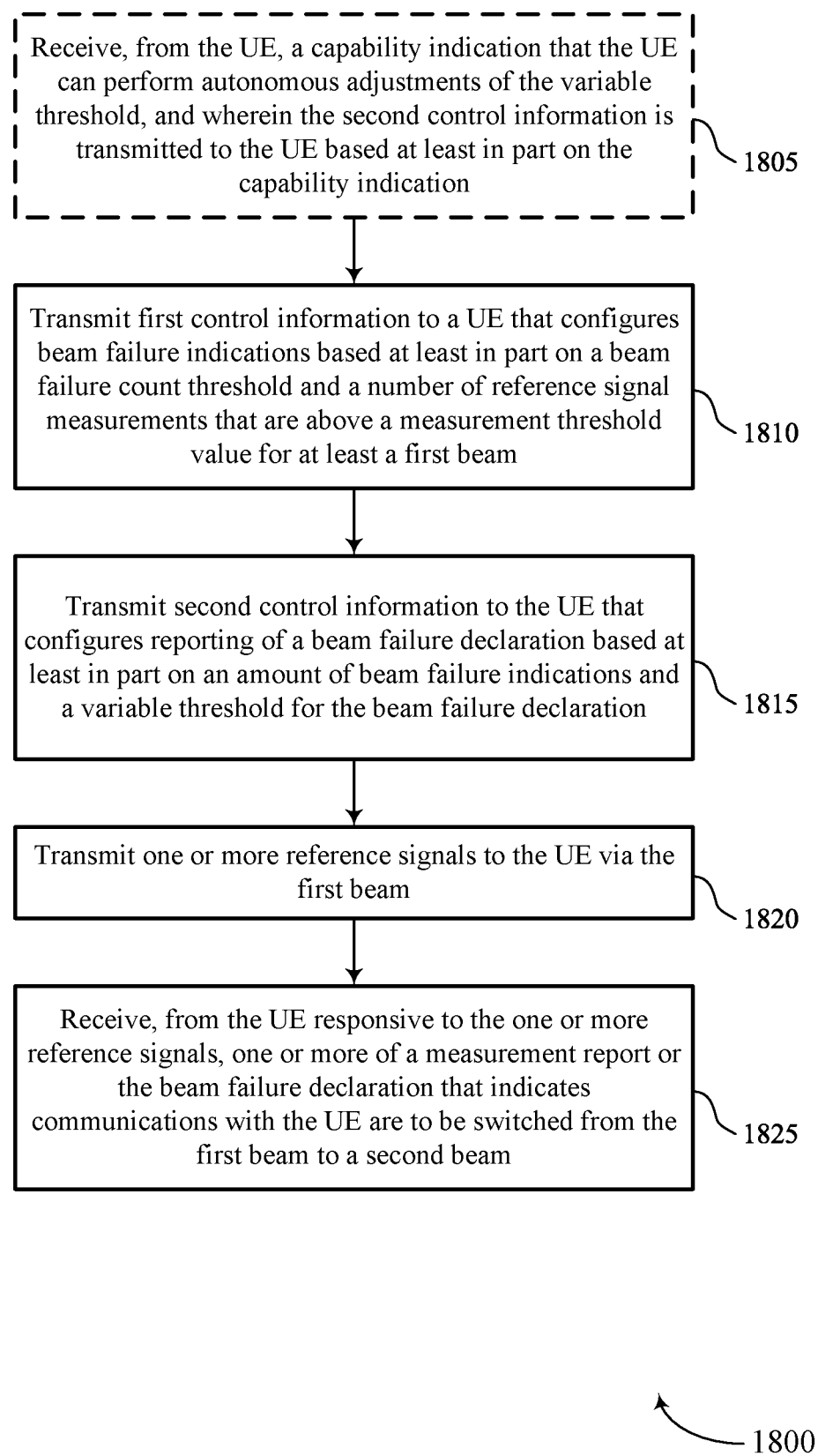

FIG. 18 shows a flowchart illustrating a method 1800 that supports techniques for beam failure recovery in wireless communications in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

Optionally, at 1805, the method may include receiving, from the UE, a capability indication that the UE can perform autonomous adjustments of the variable threshold, and where the second control information is transmitted to the UE based on the capability indication. The operations of 1805 may be performed in accordance with examples as disclosed herein. In some examples, aspects of the operations of 1805 may be performed by a configuration manager 1325 as described with reference to FIG. 13.

At 1810, the method may include transmitting first control information to a UE that configures beam failure indications based on a beam failure count threshold and a number of reference signal measurements that are above a measurement threshold value for at least a first beam. The operations of 1810 may be performed in accordance with examples as disclosed herein. In some examples, aspects of the operations of 1810 may be performed by a configuration manager 1325 as described with reference to FIG. 13.

At 1815, the method may include transmitting second control information to the UE that configures reporting of a beam failure declaration based on an amount of beam failure indications and a variable threshold for the beam failure declaration. The operations of 1815 may be performed in accordance with examples as disclosed herein. In some examples, aspects of the operations of 1815 may be performed by a configuration manager 1325 as described with reference to FIG. 13.

At 1820, the method may include transmitting one or more reference signals to the UE via the first beam. The operations of 1820 may be performed in accordance with examples as disclosed herein. In some examples, aspects of the operations of 1820 may be performed by a reference signal manager 1330 as described with reference to FIG. 13.

At 1825, the method may include receiving, from the UE responsive to the one or more reference signals, one or more of a measurement report or the beam failure declaration that indicates communications with the UE are to be switched from the first beam to a second beam. The operations of 1825 may be performed in accordance with examples as disclosed herein. In some examples, aspects of the operations of 1825 may be performed by a beam manager 1335 as described with reference to FIG. 13. In some cases, the first control information provides one or more beam failure parameters for use at a physical layer of the UE to estimate a BLER and update a beam failure count based on BLER estimates from the reference signal measurements.

Figure 19:
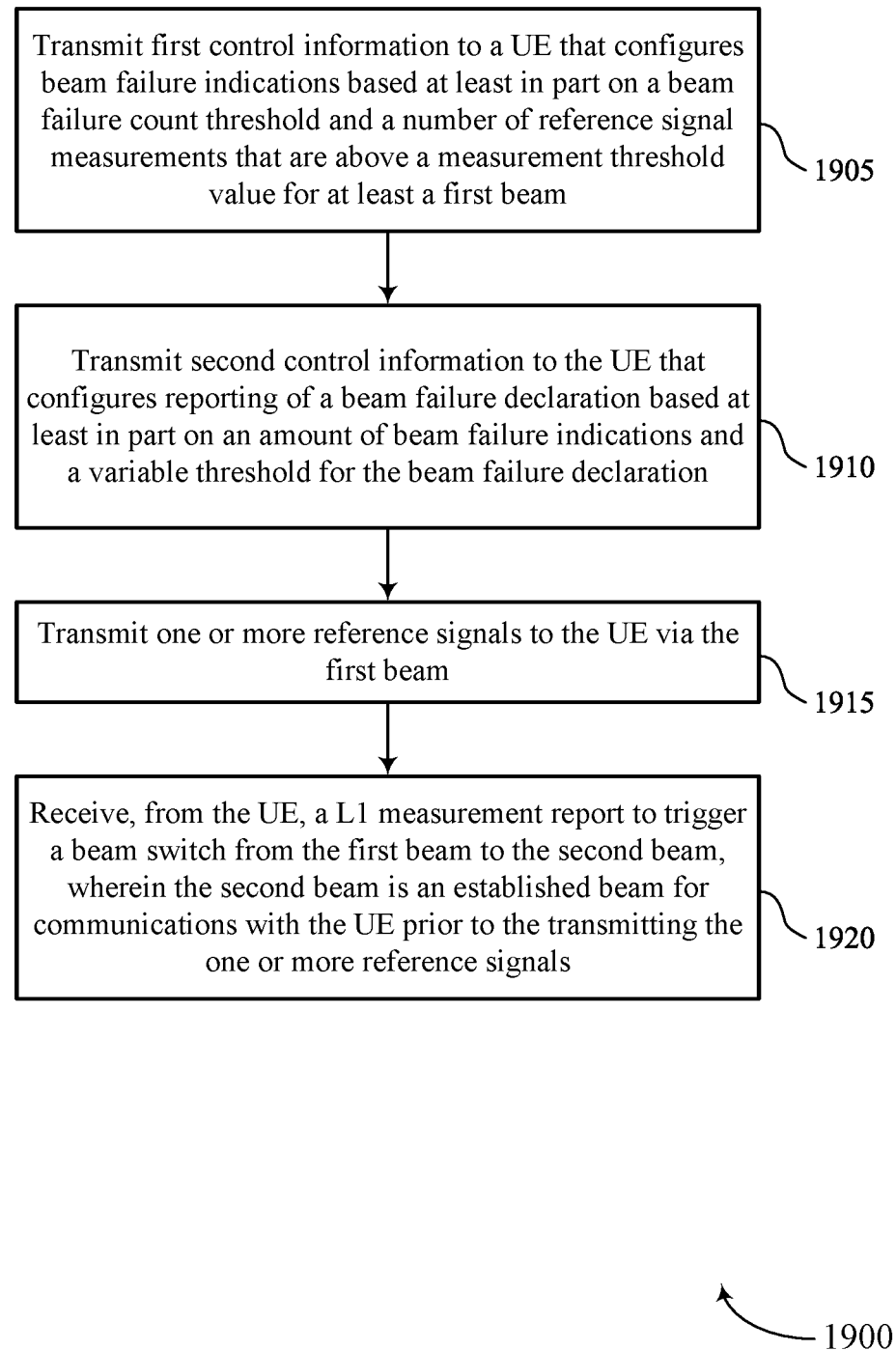

FIG. 19 shows a flowchart illustrating a method 1900 that supports techniques for beam failure recovery in wireless communications in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting first control information to a UE that configures beam failure indications based on a beam failure count threshold and a number of reference signal measurements that are above a measurement threshold value for at least a first beam. The operations of 1905 may be performed in accordance with examples as disclosed herein. In some examples, aspects of the operations of 1905 may be performed by a configuration manager 1325 as described with reference to FIG. 13.

At 1910, the method may include transmitting second control information to the UE that configures reporting of a beam failure declaration based on an amount of beam failure indications and a variable threshold for the beam failure declaration. The operations of 1910 may be performed in accordance with examples as disclosed herein. In some examples, aspects of the operations of 1910 may be performed by a configuration manager 1325 as described with reference to FIG. 13.

At 1915, the method may include transmitting one or more reference signals to the UE via the first beam. The operations of 1915 may be performed in accordance with examples as disclosed herein. In some examples, aspects of the operations of 1915 may be performed by a reference signal manager 1330 as described with reference to FIG. 13.

At 1920, the method may include receiving, from the UE, a L1 measurement report to trigger a beam switch from the first beam to a second beam, wherein the second beam is an established beam for communications with the UE prior to the transmitting the one or more reference signals. The operations of 1920 may be performed in accordance with examples as disclosed herein. In some examples, aspects of the operations of 1920 may be performed by a beam manager 1335 as described with reference to FIG. 13.

The following provides an overview of aspects of the present disclosure:

Aspect 1: A method for wireless communication at a UE, comprising: measuring one or more reference signals transmitted by a base station on at least a first beam to obtain one or more reference signal measurements of the first beam; identifying a presence of a beam failure indication based at least in part on a beam failure count threshold and a number of the one or more reference signal measurements that are above a measurement threshold value; and transmitting a beam failure declaration to the base station based at least in part on a number of instances of the beam failure indication and a variable threshold for triggering the beam failure declaration.

Aspect 2: The method of aspect 1, wherein the measuring and identifying are performed at a physical layer of the UE, and a medium access control (MAC) layer determines the variable threshold for triggering the beam failure declaration.

Aspect 3: The method of any of aspects 1 through 2, wherein the measuring comprises: measuring a reference signal received power of the one or more reference signals; and determining a block error rate (BLER) estimate for communications with the base station on the first beam based at least in part on the reference signal received power.

Aspect 4: The method of aspect 3, wherein the identifying the presence of the beam failure indication comprises: determining that the BLER estimate exceeds the measurement threshold value; updating a beam failure count based at least in part on the determining that the BLER estimate exceeds the measurement threshold value; and initiating a beam failure count timer if the beam failure count timer is not running.

Aspect 5: The method of aspect 4, wherein the identifying the presence of the beam failure indication further comprises: determining, prior to an expiration of the beam failure count timer, that the updated beam failure count meets the beam failure count threshold; and transmitting, to the base station, a layer one (L1) measurement report to trigger a beam switch from the first beam to a second beam, wherein the second beam is an established beam for communications with the base station prior to the measuring.

Aspect 6: The method of any of aspects 4 through 5, wherein the BLER estimate is determined for a single beam that is established for communications between the UE and the base station, and the beam failure indication is provided to a medium access control (MAC) layer when the updated beam failure count meets the beam failure count threshold prior to an expiration of the beam failure count timer; or the BLER estimate is determined for two or more beams that are established for communications between the UE and the base station and beam failure counts are maintained separately for each of the two or more beams, and the beam failure indication is provided to the MAC layer when the updated beam failure counts of each of the two or more beams meet the beam failure count threshold prior to expiration of the beam failure count timer.

Aspect 7: The method of any of aspects 4 through 6, wherein the beam failure count threshold is selected from a first value or a second value based at least in part on channel conditions between the UE and the base station, the first value being less than the second value, and wherein the first value is selected based at least in part on identification of relatively poor channel conditions and the second value is selected based at least in part on identification of relatively good channel conditions.

Aspect 8: The method of any of aspects 1 through 7, further comprising: receiving, from the base station, one or more beam failure parameters that indicate the beam failure count threshold, the measurement threshold value, a beam failure count timer value, or any combinations thereof.

Aspect 9: The method of aspect 8, wherein the one or more beam failure parameters are received in RRC signaling, in a medium access control (MAC) control element, in a downlink control information communication, or any combinations thereof.

Aspect 10: The method of any of aspects 8 through 9, further comprising: transmitting, to the base station, a request to switch the one or more beam failure parameters in a medium access control (MAC) control element, or an uplink control information communication.

Aspect 11: The method of any of aspects 1 through 10, wherein the variable threshold is determined autonomously at the UE.

Aspect 12: The method of aspect 11, further comprising: adjusting the variable threshold based at least in part on a number of consecutive beam failure indications (BFIs) that have been received from a physical layer of the UE for two or more reference signal measurement occasions.

Aspect 13: The method of aspect 12, wherein the adjusting comprises: adjusting a BFI count threshold for triggering the beam failure declaration to be higher than an initial BFI count threshold value when the number of consecutive BFIs are less than a predetermined value; and adjusting the BFI count threshold to be lower than the initial BFI count threshold value when the number of consecutive BFIs are equal to or greater than the predetermined value.

Aspect 14: The method of any of aspects 11 through 13, wherein the variable threshold is determined based at least in part on one or more calculation procedures configured by the base station via RRC signaling, a medium access control (MAC) control element, a DCI communication, or any combinations thereof.

Aspect 15: The method of any of aspects 11 through 14, wherein the variable threshold is determined by a machine learning algorithm based at least in part on the one or more reference signal measurements of a signal and interference to noise ratio (SINR), a signal to noise ratio (SNR), a reference signal received power (RSRP), an interference measurement, or any combinations thereof.

Aspect 16: The method of any of aspects 1 through 15, further comprising: transmitting, to the base station, a capability indication that the UE can perform autonomous adjustments of the variable threshold.

Aspect 17: The method of aspect 16, further comprising: receiving, from the base station, an activation or deactivation signal that activates or deactivates the autonomous adjustments of the variable threshold.

Aspect 18: The method of any of aspects 16 through 17, wherein the capability indication is based at least in part on a machine learning capability of the UE, an amount of processing power or processing capacity available at the UE, an amount of memory available at the UE, an amount of available computation resources available at the UE, or any combinations thereof.

Aspect 19: A method for wireless communication at a base station, comprising: transmitting first control information to a UE that configures beam failure indications based at least in part on a beam failure count threshold and a number of reference signal measurements that are above a measurement threshold value for at least a first beam; transmitting second control information to the UE that configures reporting of a beam failure declaration based at least in part on an amount of beam failure indications and a variable threshold for the beam failure declaration; transmitting one or more reference signals to the UE via the first beam; and receiving, from the UE responsive to the one or more reference signals, one or more of a measurement report or the beam failure declaration that indicates communications with the UE are to be switched from the first beam to a second beam.

Aspect 20: The method of aspect 19, wherein the first control information provides one or more beam failure parameters for use at a physical layer of the UE to estimate a block error rate (BLER) and update a beam failure count based at least in part on BLER estimates from the reference signal measurements.

Aspect 21: The method of aspect 20, further comprising: receiving, from the UE, a layer one (L1) measurement report to trigger a beam switch from the first beam to the second beam, wherein the second beam is an established beam for communications with the UE prior to the transmitting the one or more reference signals.

Aspect 22: The method of any of aspects 19 through 21, wherein the variable threshold is determined autonomously at the UE.

Aspect 23: The method of aspect 22, wherein the second control information configures one or more calculation procedures and is transmitted to the UE via RRC signaling, a medium access control (MAC) control element, a DCI communication, or any combinations thereof.

Aspect 24: The method of any of aspects 19 through 23, further comprising: receiving, from the UE, a capability indication that the UE can perform autonomous adjustments of the variable threshold, and wherein the second control information is transmitted to the UE based at least in part on the capability indication.

Aspect 25: An apparatus for wireless communication at a UE, comprising a processor; memory coupled with the processor; and instructions stored in the memory and executable by the processor to cause the apparatus to perform a method of any of aspects 1 through 18.

Aspect 26: An apparatus for wireless communication at a UE, comprising at least one means for performing a method of any of aspects 1 through 18.

Aspect 27: A non-transitory computer-readable medium storing code for wireless communication at a UE, the code comprising instructions executable by a processor to perform a method of any of aspects 1 through 18.

Aspect 28: An apparatus for wireless communication at a base station, comprising a processor; memory coupled with the processor; and instructions stored in the memory and executable by the processor to cause the apparatus to perform a method of any of aspects 19 through 24.

Aspect 29: An apparatus for wireless communication at a base station, comprising at least one means for performing a method of any of aspects 19 through 24.

Aspect 30: A non-transitory computer-readable medium storing code for wireless communication at a base station, the code comprising instructions executable by a processor to perform a method of any of aspects 19 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting, to an access network entity, a capability indication that the UE can perform adjustments of a variable threshold for triggering a beam failure declaration;
   measuring one or more reference signals on at least a first beam of two or more active beams to obtain one or more reference signal measurements of the first beam, the two or more active beams each being active for communications at the UE prior to measurement of the one or more reference signals;
   identifying a presence of a beam failure indication based at least in part on a beam failure count threshold and a number of the one or more reference signal measurements of the first beam of the two or more active beams that are above a measurement threshold value; and
   transmitting the beam failure declaration based at least in part on a number of instances of the beam failure indication and the variable threshold for triggering the beam failure declaration.

2. The method of claim 1, wherein the measuring and identifying are performed at a physical layer of the UE, and a medium access control (MAC) layer determines the variable threshold for triggering the beam failure declaration.

3. The method of claim 1, wherein the measuring comprises:
   measuring a reference signal received power of the one or more reference signals; and
   determining a block error rate (BLER) estimate for communications on the first beam based at least in part on the reference signal received power.

4. The method of claim 3, wherein the identifying the presence of the beam failure indication comprises:
   determining that the BLER estimate exceeds the measurement threshold value;
   updating a beam failure count based at least in part on the determining that the BLER estimate exceeds the measurement threshold value; and
   initiating a beam failure count timer if the beam failure count timer is not running.

5. The method of claim 4, wherein the identifying the presence of the beam failure indication further comprises:
   determining, prior to an expiration of the beam failure count timer, that the updated beam failure count meets the beam failure count threshold; and
   transmitting a layer one (L1) measurement report to trigger a beam switch from the first beam to a second beam, wherein the second beam is an established beam for communications prior to the measuring.

6. The method of claim 4, wherein:
   the BLER estimate is determined for a single beam that is established for communications, and the beam failure indication is provided to a medium access control (MAC) layer when the updated beam failure count meets the beam failure count threshold prior to an expiration of the beam failure count timer; or
   the BLER estimate is determined for two or more beams that are established for communications and beam failure counts are maintained separately for each of the two or more beams, and the beam failure indication is provided to the MAC layer when the updated beam failure counts of each of the two or more beams meet the beam failure count threshold prior to expiration of the beam failure count timer.

7. The method of claim 4, wherein the beam failure count threshold is selected from a first value or a second value based at least in part on channel conditions between the UE and the access network entity, the first value being less than the second value, and wherein the first value is selected based at least in part on identification of relatively poor channel conditions and the second value is selected based at least in part on identification of relatively good channel conditions.

8. The method of claim 1, further comprising:
   receiving one or more beam failure parameters that indicate the beam failure count threshold, the measurement threshold value, a beam failure count timer value, or any combinations thereof.

9. The method of claim 8, wherein the one or more beam failure parameters are received in radio resource control (RRC) signaling, in a medium access control (MAC) control element, in a downlink control information communication, or any combinations thereof.

10. The method of claim 8, further comprising:
    transmitting a request to switch the one or more beam failure parameters in a medium access control (MAC) control element, or an uplink control information communication.

11. The method of claim 1, wherein the variable threshold is determined autonomously at the UE.

12. The method of claim 11, further comprising:
    adjusting the variable threshold based at least in part on a number of consecutive beam failure indications (BFIs) that have been received from a physical layer of the UE for two or more reference signal measurement occasions.

13. The method of claim 12, wherein the adjusting comprises:
    adjusting a BFI count threshold for triggering the beam failure declaration to be higher than an initial BFI count threshold value when the number of consecutive BFIs are less than a predetermined value; and
    adjusting the BFI count threshold to be lower than the initial BFI count threshold value when the number of consecutive BFIs are equal to or greater than the predetermined value.

14. The method of claim 11, wherein the variable threshold is determined based at least in part on one or more calculation procedures configured via radio resource control (RRC) signaling, a medium access control (MAC) control element, a downlink control information (DCI) communication, or any combinations thereof.

15. The method of claim 11, wherein the variable threshold is determined by a machine learning algorithm based at least in part on the one or more reference signal measurements of a signal and interference to noise ratio (SINR), a signal to noise ratio (SNR), a reference signal received power (RSRP), an interference measurement, or any combinations thereof.

16. The method of claim 1, wherein:
the capability indication indicates that the UE can perform autonomous adjustments of the variable threshold for triggering the beam failure declaration.

17. The method of claim 16, further comprising:
receiving, from the access network entity, an activation or deactivation signal that activates or deactivates the autonomous adjustments of the variable threshold.

18. The method of claim 16, wherein the capability indication is based at least in part on a machine learning capability of the UE, an amount of processing power or processing capacity available at the UE, an amount of memory available at the UE, an amount of available computation resources available at the UE, or any combinations thereof.

19. A method for wireless communication at an access network entity, comprising:
receiving, from a user equipment (UE), a capability indication that the UE can perform adjustments of a variable threshold for a beam failure declaration;
transmitting first control information to the UE that configures beam failure indications based at least in part on a beam failure count threshold and a number of reference signal measurements of a first beam of two or more active beams that are above a measurement threshold value, the two or more active beams each being active for communications with the UE prior to the reference signal measurements;
transmitting second control information to the UE that configures reporting of the beam failure declaration based at least in part on an amount of beam failure indications and the variable threshold for the beam failure declaration;
transmitting one or more reference signals to the UE via the first beam; and
receiving, from the UE responsive to the one or more reference signals, one or more of a measurement report or the beam failure declaration that indicates communications with the UE are to be switched from the first beam to a second beam of the two or more active beams.

20. The method of claim 19, wherein the first control information provides one or more beam failure parameters for use at a physical layer of the UE to estimate a block error rate (BLER) and update a beam failure count based at least in part on BLER estimates from the reference signal measurements.

21. The method of claim 20, further comprising:
receiving, from the UE, a layer one (L1) measurement report to trigger a beam switch from the first beam to the second beam, wherein the second beam is an established beam for communications with the UE prior to the transmitting the one or more reference signals.

22. The method of claim 19, wherein the variable threshold is determined autonomously at the UE.

23. The method of claim 22, wherein the second control information configures one or more calculation procedures and is transmitted to the UE via radio resource control (RRC) signaling, a medium access control (MAC) control element, a downlink control information (DCI) communication, or any combinations thereof.

24. The method of claim 19, wherein:
the capability indication indicates that the UE can perform autonomous adjustments of the variable threshold, and wherein the second control information is transmitted to the UE based at least in part on the capability indication.

25. An apparatus for wireless communication at a user equipment (UE), comprising:
a processor;
memory coupled with the processor; and
instructions stored in the memory and executable by the processor to cause the apparatus to:
transmit, to an access network entity, a capability indication that the UE can perform adjustments of a variable threshold for triggering a beam failure declaration;
measure one or more reference signals on at least a first beam of two or more active beams to obtain one or more reference signal measurements of the first beam, the two or more active beams each being active for communications at the UE prior to measurement of the one or more reference signals;
identify a presence of a beam failure indication based at least in part on a beam failure count threshold and a number of the one or more reference signal measurements of the first beam of the two or more active beams that are above a measurement threshold value; and
transmit the beam failure declaration based at least in part on a number of instances of the beam failure indication and the variable threshold for triggering the beam failure declaration.

26. The apparatus of claim 25, wherein the instructions to measure are executable by the processor to cause the apparatus to:
measure a reference signal received power of the one or more reference signals;
determine a block error rate (BLER) estimate for communications on the first beam based at least in part on the reference signal received power;
determine that the BLER estimate exceeds the measurement threshold value;
update a beam failure count based at least in part on the determining that the BLER estimate exceeds the measurement threshold value;
initiate a beam failure count timer if the beam failure count timer is not running;
determine, prior to an expiration of the beam failure count timer, that the updated beam failure count meets the beam failure count threshold; and
transmit a layer one (L1) measurement report to trigger a beam switch from the first beam to a second beam, wherein the second beam is an established beam for communications prior to the measuring.

27. The apparatus of claim 25, wherein the variable threshold is determined autonomously at the UE, and wherein the instructions are further executable by the processor to cause the apparatus to:

adjust the variable threshold based at least in part on a number of consecutive beam failure indications (BFIs) that have been received from a physical layer of the UE for two or more reference signal measurement occasions.

28. An apparatus for wireless communication at an access network entity, comprising:
a processor;
memory coupled with the processor; and
instructions stored in the memory and executable by the processor to cause the apparatus to:
receive, from a user equipment (UE), a capability indication that the UE can perform adjustments of a variable threshold for a beam failure declaration;
transmit first control information to the UE that configures beam failure indications based at least in part on a beam failure count threshold and a number of reference signal measurements of a first beam of two or more active beams that are above a measurement threshold value, the two or more active beams each being active for communications with the UE prior to the reference signal measurements;
transmit second control information to the UE that configures reporting of the beam failure declaration based at least in part on an amount of beam failure indications and the variable threshold for the beam failure declaration;
transmit one or more reference signals to the UE via the first beam; and
receive, from the UE responsive to the one or more reference signals, one or more of a measurement report or the beam failure declaration that indicates communications with the UE are to be switched from the first beam to a second beam of the two or more active beams.

29. The apparatus of claim 28, wherein the instructions are further executable by the processor to cause the apparatus to:
receive, from the UE, a layer one (L1) measurement report to trigger a beam switch from the first beam to the second beam, wherein the second beam is an established beam for communications with the UE prior to the transmitting the one or more reference signals.

30. The apparatus of claim 28, wherein the variable threshold is determined autonomously at the UE, and wherein the second control information configures one or more calculation procedures and is transmitted to the UE via radio resource control (RRC) signaling, a medium access control (MAC) control element, a downlink control information (DCI) communication, or any combinations thereof.

* * * * *